United States Patent

Kanno et al.

[11] Patent Number: 5,113,254
[45] Date of Patent: May 12, 1992

[54] ELECTRONIC ENDOSCOPE APPARATUS OUTPUTTING TERNARY DRIVE SIGNAL

[75] Inventors: Masahide Kanno; Masao Uehara; Masahiko Sasaki; Katsuyuki Saito; Akinobu Uchikubo, all of Hachioji; Jun Hasegawa, Hino; Katsuyoshi Sasagawa, Shirakawa; Shinji Yamashita; Takehiro Nakagawa, both of Hachioji, all of Japan

[73] Assignee: Olympus Optical Co., Ltd., Tokyo, Japan

[21] Appl. No.: 473,260

[22] Filed: Jan. 31, 1990

[30] Foreign Application Priority Data

Jun. 4, 1989 [JP] Japan ................................ 1-87251
Nov. 10, 1989 [JP] Japan ................................ 1-265924

[51] Int. Cl.⁵ ............................ H04N 7/18; A61B 1/4
[52] U.S. Cl. ............................ 358/98; 358/42; 358/213.26; 358/213.27; 128/6
[58] Field of Search ................ 358/98, 213.26, 213.27, 358/42; 128/4, 6

[56] References Cited

U.S. PATENT DOCUMENTS

| | | | |
|---|---|---|---|
| 4,667,230 | 5/1987 | Arakawa et al. | 358/98 |
| 4,706,118 | 11/1987 | Kato et al. | 358/98 |
| 4,716,317 | 12/1987 | Spierings | 358/213.26 |
| 4,807,025 | 2/1989 | Eino et al. | 358/98 |
| 4,816,909 | 3/1989 | Kimura et al. | 358/42 |
| 4,887,153 | 12/1989 | Uehara et al. | 358/42 |
| 4,891,695 | 1/1990 | Uchikubo et al. | 358/98 |
| 4,926,258 | 5/1990 | Sasaki et al. | 358/98 |

Primary Examiner—James J. Groody
Assistant Examiner—Michael H. Lee
Attorney, Agent, or Firm—Armstrong & Kubovcik

[57] ABSTRACT

An endoscope apparatus is disclosed in which the horizontal transfer of the charge of a solid imaging device such as a CCD and the resetting for the detection of the charge are conducted by a common drive signal. The signal transmitted from the solid imaging device is caused to contain a feed-through period by making the drive signal to be served by a multi-valued level horizontal transfer signal exceeding a trinary value. Therefore, reset noise or the like can be eliminated by processing the output signal by using a correlated double sampling circuit or the like so that a video signal exhibiting a good S/N ratio can be obtained.

37 Claims, 27 Drawing Sheets

FIG. 6
*(PRIOR ART)*
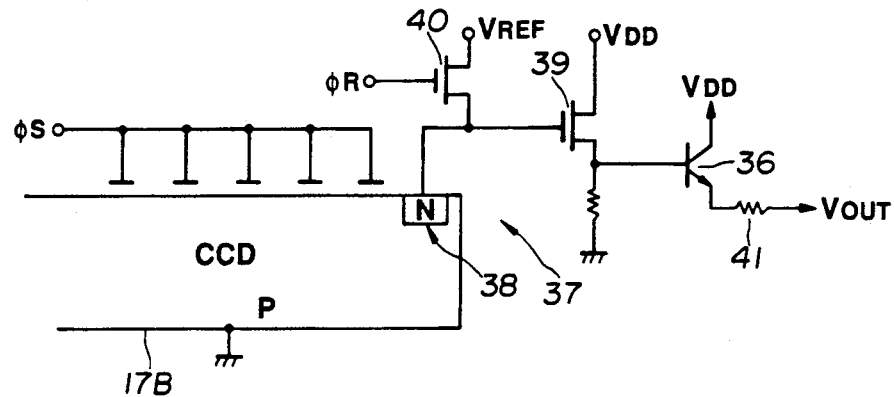
FIG. 7a
*(PRIOR ART)*
FIG. 7b
*(PRIOR ART)*
FIG. 7c
*(PRIOR ART)*
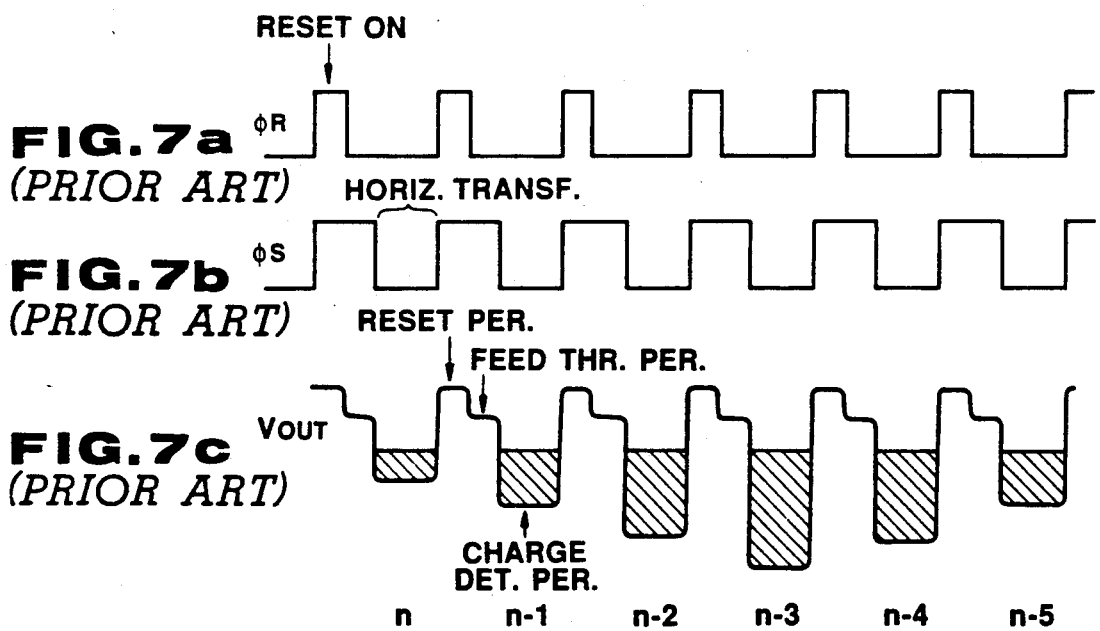

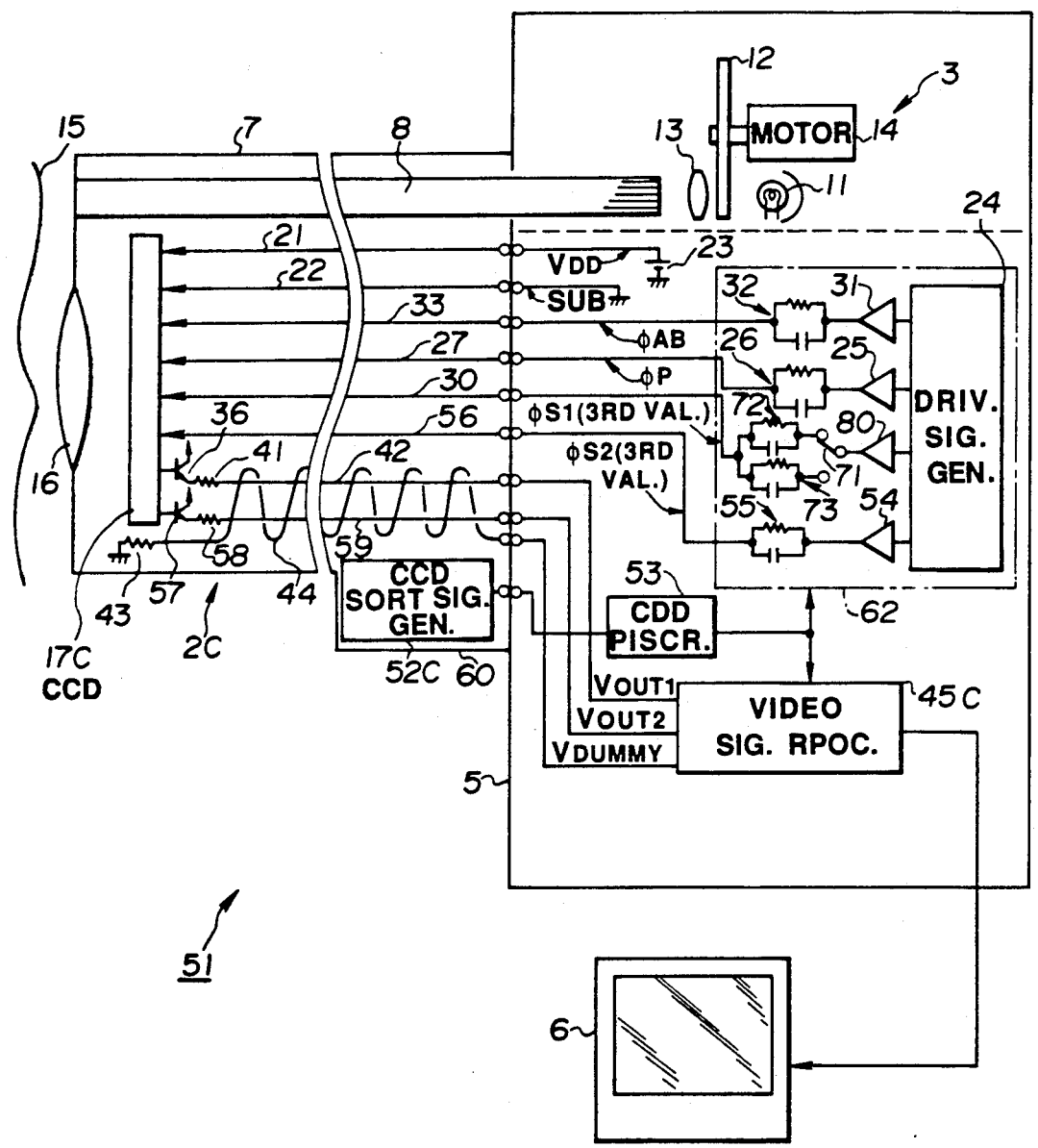

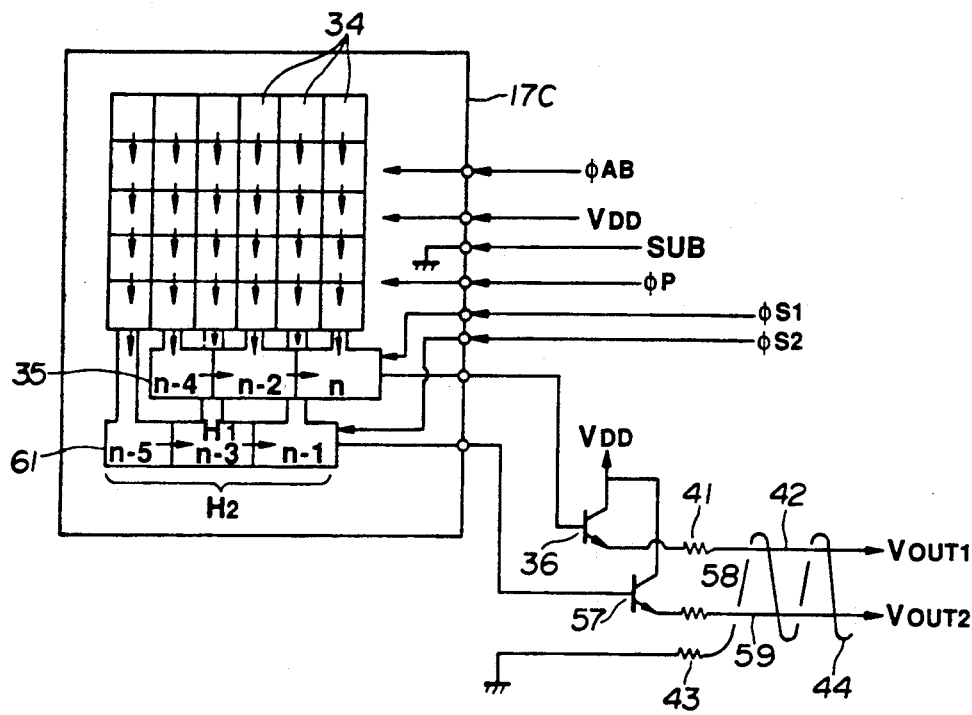
FIG. 9
FIG. 10a
FIG. 10b φAB
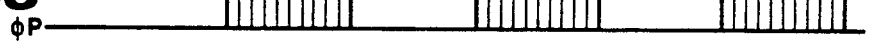
FIG. 10c φP
FIG. 10d φS1
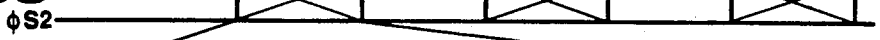
FIG. 10e φS2
FIG. 10c' φP
FIG. 10d' φS1
FIG. 10e' φS2

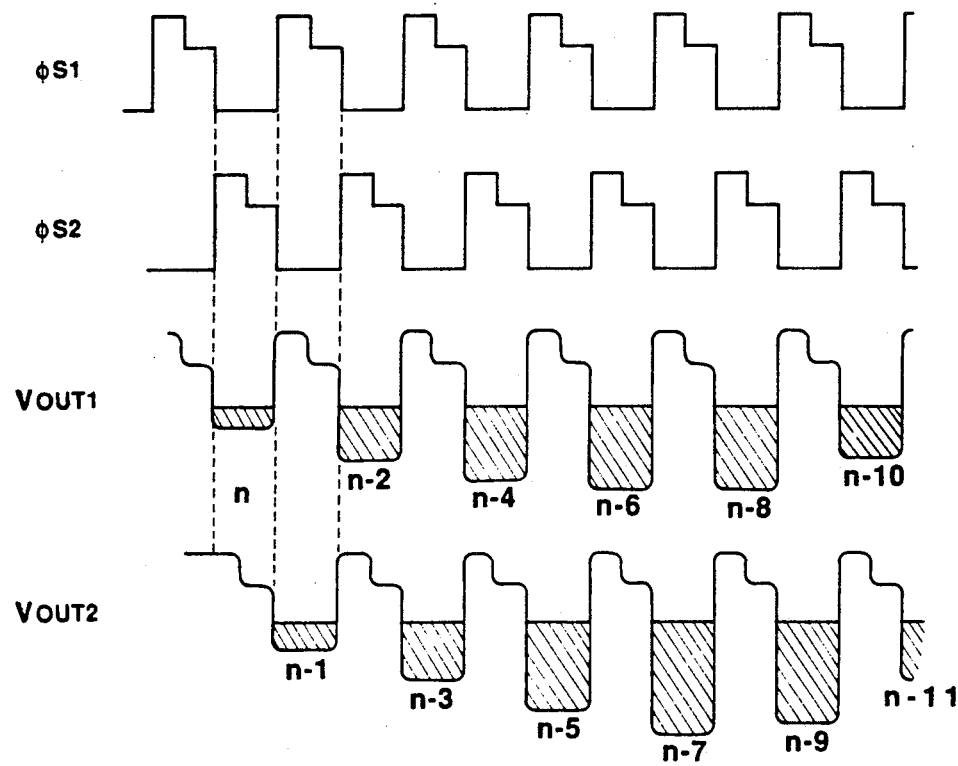
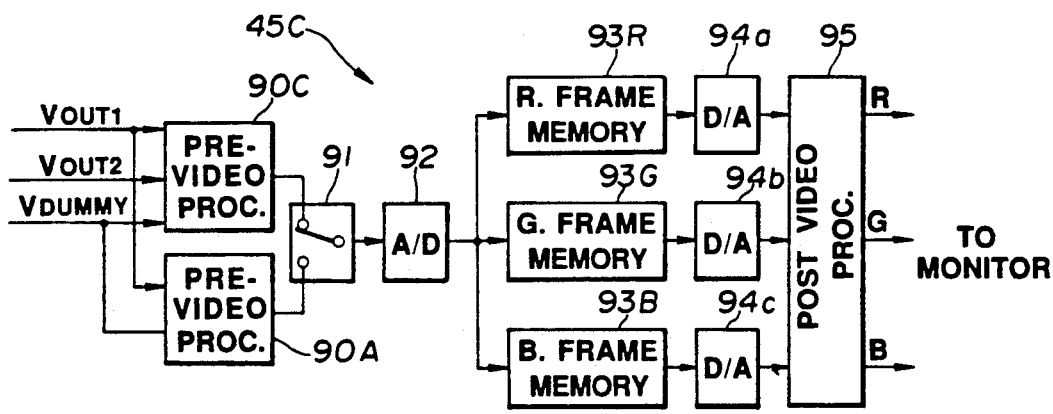

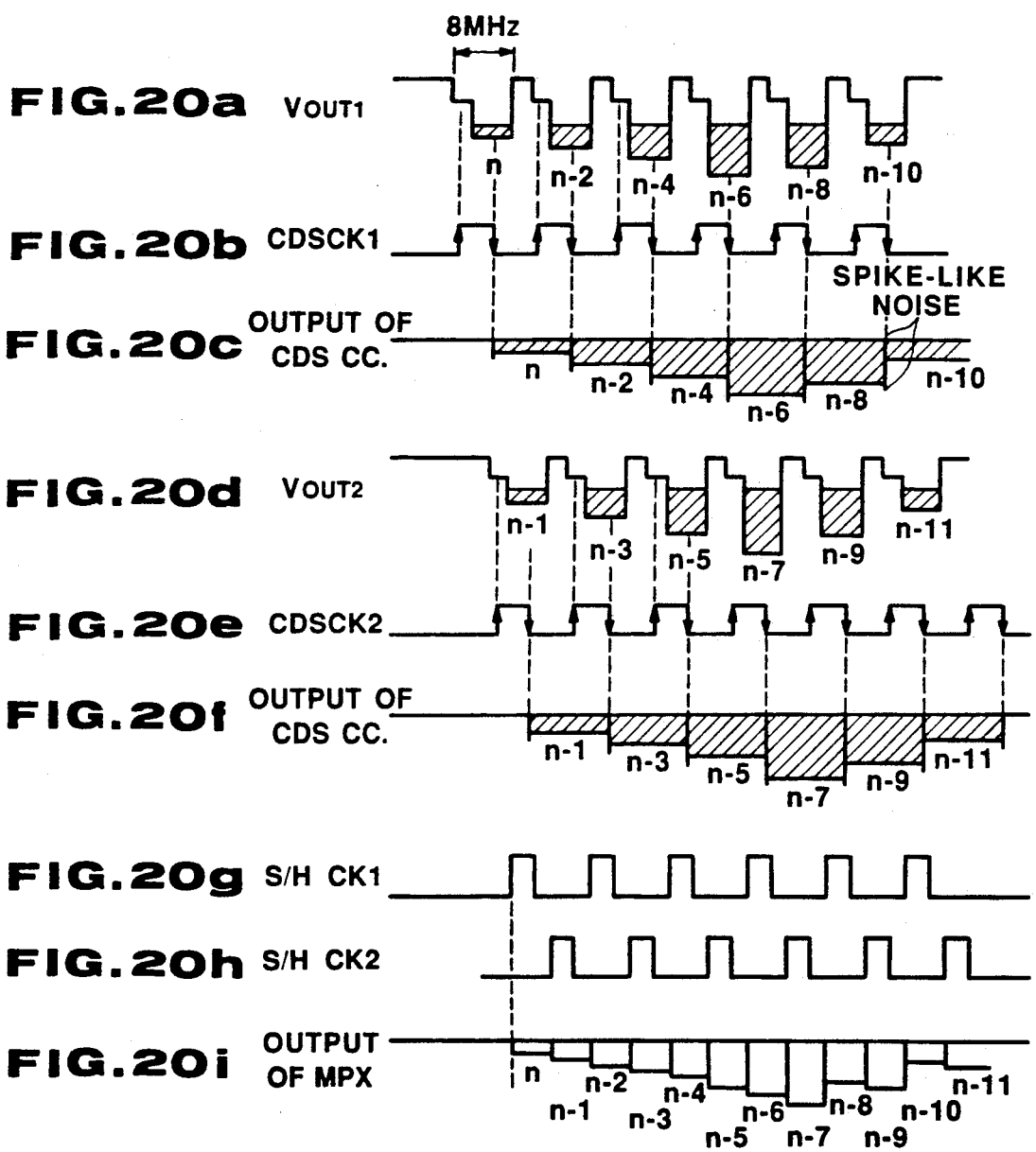

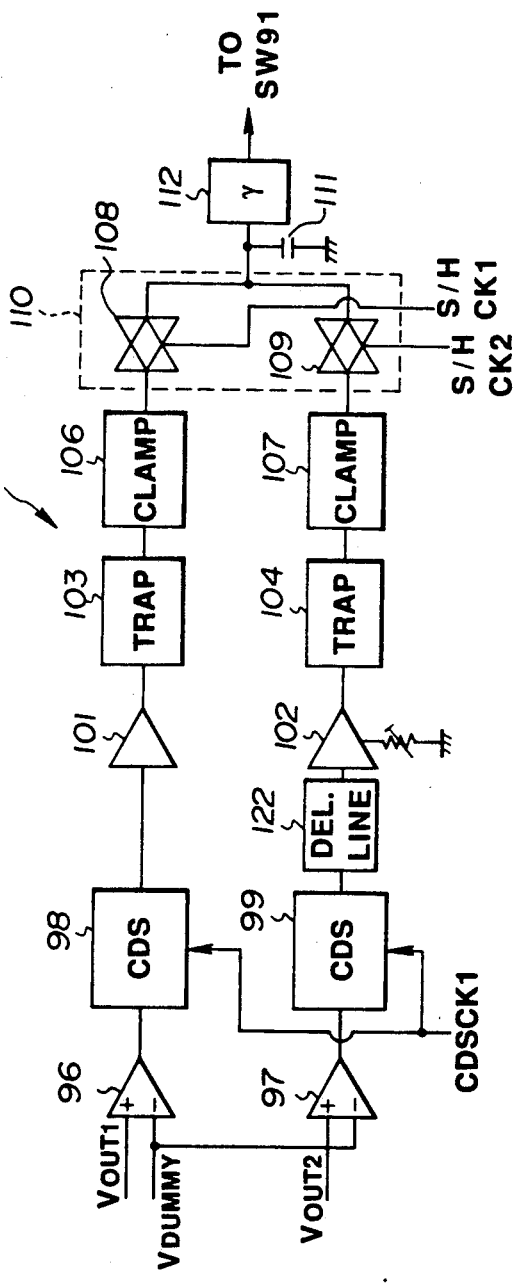

FIG. 35
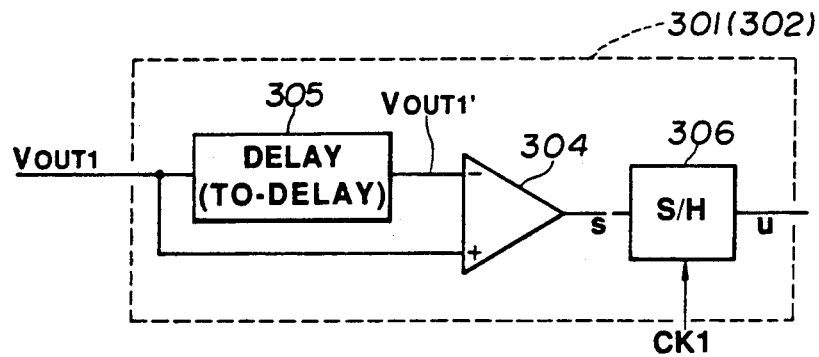
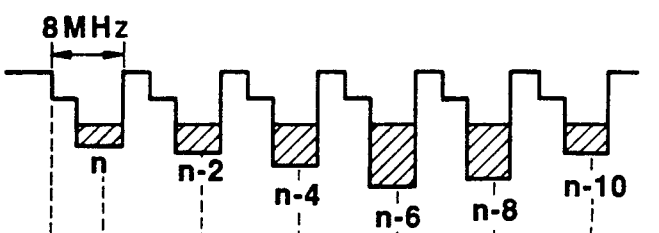
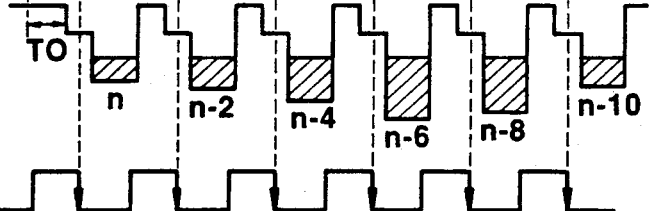
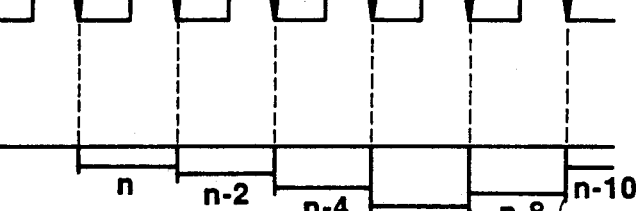
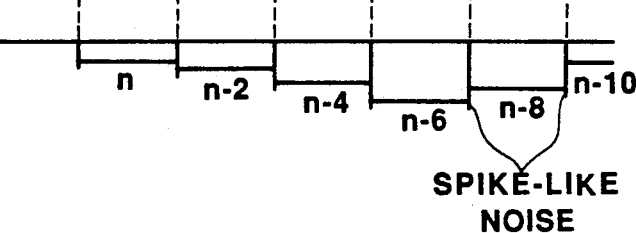
SPIKE-LIKE NOISE

ELECTRONIC ENDOSCOPE APPARATUS OUTPUTTING TERNARY DRIVE SIGNAL

BACKGROUND OF THE INVENTION

Field of the Invention

The present invention relates to an electronic endoscope apparatus for supplying a multi-valued drive signal, which is higher than a ternary value, to a solid imaging device so as to create a feed-through period for the purpose of eliminating noise in the output signal from the solid imaging device.

Recently, an optical endoscope has been widely used which allows observation of diseased areas of the coelom and, if necessary, aids in medical treatment of the diseased areas with a treatment device by allowing the insertion of an elongated portion, thus obviating an incision.

An electronic or electron endoscope without the image guide of the above-described optical endoscope but having a solid imaging device such as a CCD (a Charge Coupled Device) at the position of the focal plane of an object lens thereof has been put into practical use.

The electron endoscope of the type described above constitutes an electron endoscope apparatus comprising a light source which is employed similarly to that of the above-described optical endoscope, a signal processing device and display means.

FIG. 1 illustrates an electron endoscope apparatus 1 according to a first conventional example.

The electron endoscope apparatus 1 shown in FIG. 1 comprises: an electron endoscope (to be abbreviated to "an electron scope" hereinafter) 2A including imaging means; a video processor 5 including a light source portion 3 for supplying illumination light to the electron scope 2A and a signal processing portion 4 for processing signals to be supplied to the electron scope 2A; and a monitor 6 for displaying the video signal which has been processed in the signal processing portion 4, the video signal being displayed in the form of an image.

The above-described electron scope 2A has an elongated portion 7 to be inserted into the coelom. A light guide 8 for transmitting illumination light and inserted into the elongated portion 7 has a light incidental terminal connected to the light source portion 3 so that illumination light is supplied through the light guide 8. White light, emitted from a lamp 11 disposed in the light source portion 3, is converted into successive light consisting of red, green and blue by a rotary filter 12 having color transmissive filters for the three primaries: red, green and blue and allowing the white light to pass through. Light thus converted is converged by a convergent lens 13 so as to be supplied, as illumination light, to the light incidental surface of a light guide 8. The above-described rotary filter 12 is arranged to be rotated by a motor 14.

Red, green and blue illumination light transmitted through the light guide 8 is emitted from the light-emitting surface of the light guide to a subject 15. Light reflected from the subject 15 forms an image of the subject 15 on the imaging surface of a CCD17A disposed on the focal plane of an object lens 16 fastened to the end portion of the portion 7 to be inserted into the coelom. The CCD17A photoelectrically converts the image thus formed so as to store it as a signal charge.

The above-described CCD17A is arranged to receive power from a power source 23 via a power supply line 21 and a ground line 22 respectively connected to a power source terminal VDD and a ground terminal SUB adjacent to the video processor 5.

The level of a vertical transfer clock $\phi p$ transmitted from a drive signal generating circuit 24' is changed by a driver 25. The waveform of the vertical transfer clock $\phi p$ whose level has been changed is then shaped by a matching circuit 26 constituted by a capacitor C and a resistor R. The vertical transfer clock $\phi p$ whose waveform has been shaped is then transmitted to the CCD17A via a vertical transfer clock transmitting cable (to be abbreviated to "a $\phi p$ transmitting cable" or "a $\phi p$ cable" hereinafter) 27.

The drive signal generating circuit 24A also generates a horizontal transfer clock $\phi s$ the voltage level of which is then changed by a driver 28. The waveform of the horizontal transfer clock $\phi s$ the voltage level of which has been changed is then shaped by a matching circuit 29 constituted by a capacitor C and a resistor R. It is then transmitted to the CCD17A via a horizontal transfer clock transmitting cable (to be abbreviated to "a $\phi s$ transmitting cable" or "a $\phi s$ cable" hereinafter) 30.

The drive signal generating circuit 24A also generates a blooming control clock $\phi AB$ the voltage level of which is then changed by a driver 31. The waveform of the blooming control clock $\phi AB$ the voltage level of which has been changed is then shaped by a matching circuit 32 constituted by a capacitor C and a resistor R. It is then transmitted to the CCD17A via a blooming control clock transmitting cable (to be abbreviated to "a $\phi AB$ transmitting cable" or "a $\phi AB$ cable" hereinafter) 33.

As shown in FIG. 2, optical information imaged on the CCD17A is photoelectrically converted so as to be stored in each of pixels 34 as a charge. At this time, blooming is prevented by the blooming control clock $\phi AB$. The charge thus stored is transferred vertically by the vertical transfer clock $\phi p$ in a direction designated by an arrow so that it reaches a horizontal transfer register 35. The charge in the horizontal transfer register 35 is transferred horizontally by a quantity corresponding to one pixel due to an addition of the horizontal transfer clock $\phi s$ so as to be supplied, as an output from the CCD17A, to a buffer transistor 36.

Then, a state where the signal is transmitted from the CCD17A will be described in detail with reference to FIG. 3.

The horizontal transfer clock $\phi s$ transfers the charge stored in the horizontal transfer register 35 to a charge detection circuit 37 (a synthetic capacity of a floating diffusion layer 38 constituted by N channels and the gate and line capacity of a MOS transistor 39 where the synthetic capacity being abbreviated to "an FDA" hereinafter). Furthermore, the horizontal transfer clock $\phi s$ turns on a reset transistor 40 so as to reset the FDA. In the case, the operation is performed as shown in FIG. 4.

As shown in FIG. 4A, the FDA is reset when the horizontal transfer clock $\phi s$ is at the high level, while the charge of the horizontal transfer register 35 is transferred to the FDA when the horizontal transfer clock $\phi s$ is at the low level.

As shown in FIG. 4B, the waveform of a signal Vout transmitted from the buffer transistor 36 is in the form consisting of only reset periods and charge detection periods and having no feed-through period which corresponds to zero charge at this time. Referring to FIG. 4B, the hatched section shows a CCD charge detection level.

As described above, the output signal Vout from the CCD17A and transmitted via the buffer transistor 36 is further transmitted through a Vout (a transmitting) cable 42 via a matching resistor 41 of the cable. The Vout cable 42 is introduced into a video signal processing circuit 45A disposed in the video processor 5 together with a noise-cancelling dummy cable 44 grounded via a resistor 43 having the same resistance level as that of a matching resistance 41 disposed adjacent to the CCD17A.

In the video signal processing circuit 45A, the difference is obtained between the output signal Vout from the above-described CCD 17 and a dummy signal $V_{DUMMY}$ from the noise cancelling dummy cable 44, that is the difference from inductive noise on the cable 44 so as to convert the thus obtained difference into a TV signal, the TV signal thus converted being then transmitted to the monitor 6. Thus, the endoscope image obtained by the electron scope 2 is displayed on the monitor 6.

According to the above-described first conventional example, since a sole signal $\phi s$ is employed so as to serve as both the clock for horizontally transferring the charge in the horizontal transfer register 35 and the clock for turning of/off the transistor which resets the FDA, a so-called feed-through period is not present in the waveform of the output signal Vout as shown in FIG. 4B.

Therefore, it is impossible for the reset noise and 1/f noise contained in the output signal Vout to be eliminated in the video signal processing circuit 45A in the video processor 5 by using a correlation double sampling (to be abbreviated to "CDS" hereinafter) circuit.

Then, a second conventional example will be described with reference to FIGS. 5 to 8.

The difference from the above-described first conventional example lies in a structure arranged in such a manner that a different signal from the horizontal transfer clock is used so as to serve as the clock for resetting the FDA.

FIG. 5 illustrates the overall structure of the second conventional example, where the difference from the first conventional example lies in the structure arranged to be (capable of transmitting a reset drive signal $\phi R$.

The reset clock $\phi R$ generated in a drive signal generating circuit 24B is changed in its voltage level by a driver 46 before it has been shaped by a matching circuit 47 consisting of a capacitor C and a resistor R. It is then transmitted to a CCD 17B via a reset clock transmitting cable (to be abbreviated to "a $\phi R$ transmitting cable" or "a $\phi R$ cable, hereinafter) 48.

A state in which a signal is transmitted from the CCD 17B via the FDA will be described with reference to FIGS. 6 and 7.

In the CCD 17B, a terminal for the horizontal transfer clock $\phi s$ and that of the reset clock $\phi R$ are independently provided so that the clocks $\phi s$ and $\phi R$ respectively shown in FIGS. 7B and 7A are supplied to the corresponding terminals. That is, although the charge, which has been horizontally transferred by the horizontal transfer clock $\phi s$, is transferred to the FAD, the FDA is reset at a timing shown in FIG. 7A prior to the above-described transference of the charge.

Therefore, as shown in FIG. 7C, the output signal Vout from the CCD 17B contains a period in which the FDA is reset, a charge-detection period in which the charge is transferred from the horizontal transfer register to the FDA and the charge thus transferred is detected, and the other period between the above-described two periods. That is, there is a period in which no charge is transferred from the horizontal transfer register to the FDA and the FDA is not reset, that is, a feed-through period corresponding to a so-called zero charge is present in the output signal Vout from the CCD 17B.

Thus, the video signal processing circuit 45B can be allowed to cancel reset noise and 1/f noise in the output signal Vout by using the CDS circuit. As a result, an excellent image can be obtained.

However, there arises a necessity to provide the $\phi R$ cable 48 so as to serve as a cable. Therefore, in the case of the electron scope 2B, there arises a necessity of enlarging the outer diameter of the electron scope 2B, causing the outer diameter of the front portion to be enlarged. Therefore, the patient feels pain at the time of insertion of the enlarged front portion of the electron scope 2B, or the use of the electron scope of this time is limited.

As described above, although the outer diameter of the scope 2A is not enlarged in the structure according to the first conventional example, noise contained in the output signal from its CCD cannot be eliminated.

On the other hand, since the feed-through period is contained in the output signal from its CCD, noise contained in the output signal can be eliminated by using the CDS circuit. However, a signal cable must be additionally provided, causing the outer diameter of the scope 2B to be enlarged.

OBJECTS AND SUMMARY OF THE INVENTION

An object of the present invention is to provide an electron endoscope apparatus capable of eliminating noise in an output signal from its CCD with necessity of enlarging the outer diameter of the scope eliminated.

Another object of the present invention is to provide an electron endoscope apparatus comprising a signal processing circuit which can be used widely.

An endoscope according to the present invention comprises a circuit for generating a multi-valued drive signal exceeding a ternary value so as to drive a horizontal transference through a photo-electrically conversion portion and resetting a charge detection circuit. Therefore, a feed-through period can be created in an output signal from a solid imaging device such as a charge coupled device so that reset noise or the like can be readily eliminated from the output signal or the like.

BRIEF DESCRIPTION OF THE DRAWINGS

Other objects and aspects of the invention will become apparent from the following description of embodiments with reference to the accompanying drawings in which:

FIG. 6 is a circuit diagram which illustrates the charge detection circuit of the CCD according to the second conventional example;

FIG. 7 illustrates the operation of the second conventional example;

FIGS. 8 to 22 relate to a first embodiment of the present invention, where

FIGS. 8A and 8B are schematic structural views which illustrate the overall structure of the first embodiment;

FIG. 9 illustrates the structure of the CCD;

FIG. 10 illustrates timing of exposure and reading performed by the CCD;

FIG. 12 illustrates timing of the operation performed by the means for generating a drive signal for horizontal transference shown in FIG. 11C;

FIG. 13 is a circuit diagram, the circuit serving as means for generating a drive signal for restricting blooming;

FIG. 14 illustrates the waveforms of the drive signal so as to describe the operation of the means for generating a drive signal for restricting blooming shown in FIG. 13;

FIG. 15 is a circuit diagram, the circuit serving as means for generating a drive signal for vertical transference;

FIG. 16 illustrates the waveform of the drive signal so as to describe the operation of the means for generating a drive signal for vertical transference shown in FIG. 15;

FIG. 17 illustrates the waveform of a drive signal for trinary horizontal transference and an output signal from the CCD;

FIG. 18 is a block diagram which illustrates a video signal processing circuit;

FIG. 20 illustrates timing of the operation performed by the fore-stage image processing circuit;

FIG. 21 is circuit diagram which illustrates the structure of a trap circuit;

FIG. 22 illustrates the waveforms so as to describe the operation of the trap circuit shown in FIG. 21;

FIG. 26 is a block diagram which illustrates the structure of the fore-stage image processing circuit according to the second embodiment;

FIG. 35 illustrates the structure of a delay-type noise eliminating circuit used in the fifth embodiment;

FIG. 36 illustrates the waveform so as to describe the operation performed by the delay-type noise eliminating circuit shown in FIG. 35.

DESCRIPTION OF THE PREFERRED EMBODIMENT

The overall structure of an electron endoscope apparatus 51 according to a first embodiment is schematically shown in FIG. 8A.

Figure 1:
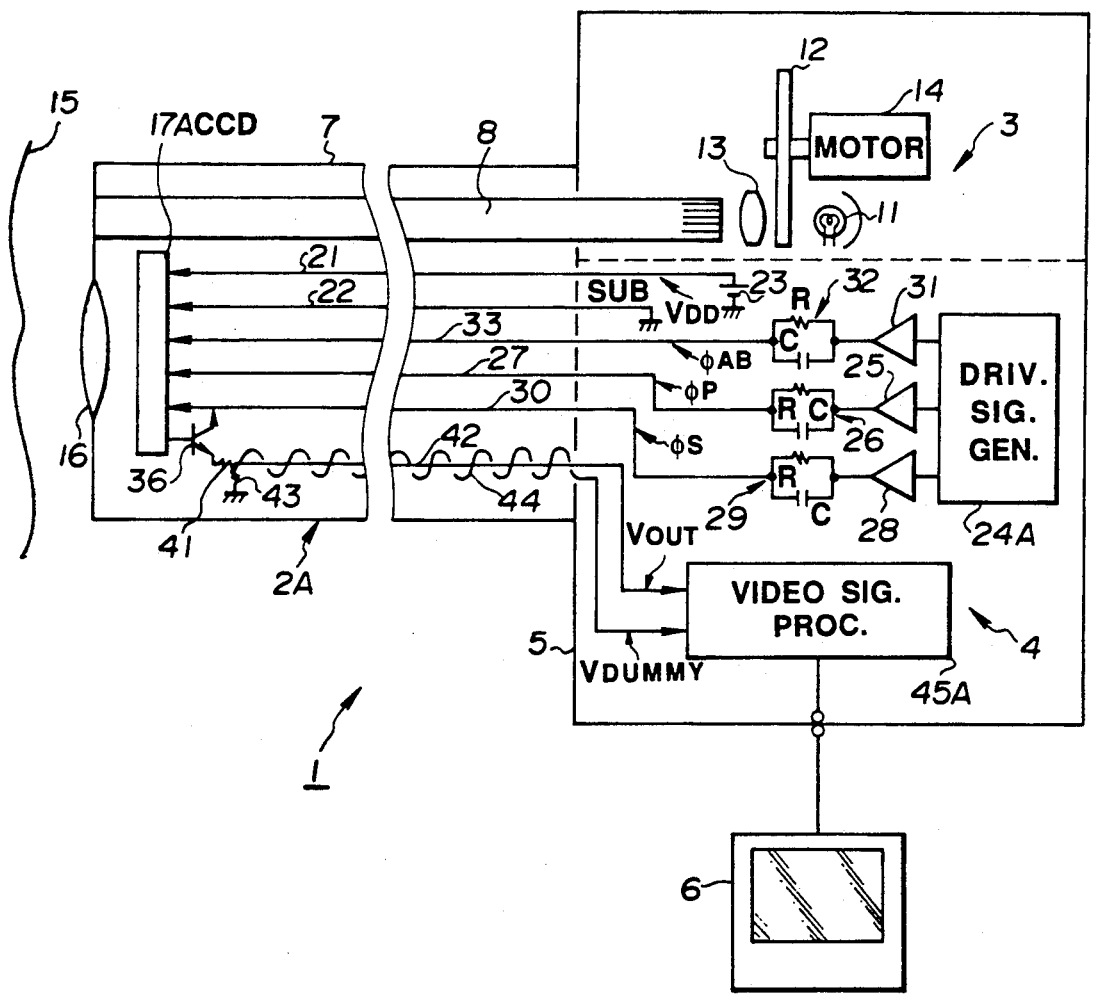
FIG. 1 illustrates the overall structure of a first conventional example.

The same elements as those shown in FIGS. 1 or 7 are given the same reference numerals and the descriptions are omitted here.

The electron endoscope apparatus 51 is arranged as follows:

(1) An electron scope 2C comprising a CCD17C having a 2-line horizontally and simultaneously reading structure can be also used in addition to the electron scope 2A comprising the CCD17A according to the first conventional example shown in FIG. 1.

(2) A correction is made by the video processor portion so as to make the most suitable driving conditions (a matching constant of the cable, the voltage level of a signal for driving the CCD and the like) for a CCD 17I (I=A or C) by discriminating the sort of the CCD 17I used in the connected electron scope 2C or 2A. Therefore, the electron scope 2I is provided with a circuit 521 for generating a signal denoting the sort of the CCD 17I. On the other hand, the video processor 5 includes a circuit 53 for discriminating the sort of the CCD 17I in accordance with a CCD sort signal generated by the CCD sort signal generating circuit 52.

(3) Horizontal transfer drive signals $\phi s1$ and $\phi s2$ for performing the 2-line horizontally and simultaneously reading are arranged to be a trinary drive waveform.

Figure 8B:
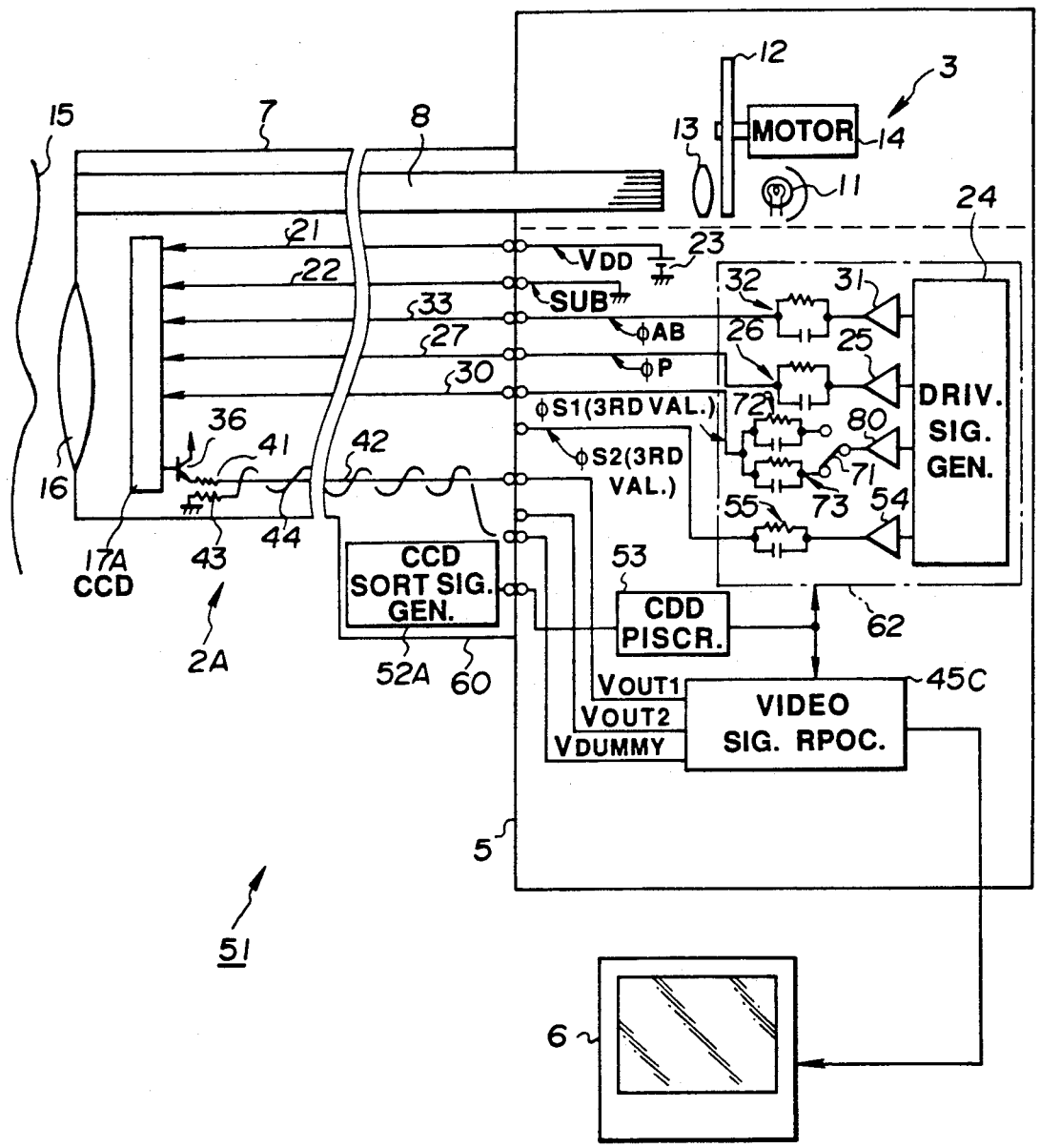

The first embodiment of the present invention features the above-described items (1), (2) and (3) (in the case where the connection is established with the CCD17A which is different from the CCD17C shown in FIG. 8, the overall structure is arranged as shown in FIG. 8B).

A circuit 24 for generating a drive signal for performing the above-described 2-line horizontally and simultaneously reading outputs a first horizontal transfer clock φs1 (which corresponds to that expressed by the horizontal transfer clock φs shown in FIG. 1, therefore, the number given to the φs transmitting cable is also used for the φs1 transmitting cable) and a second horizontal transfer clock φs2 in addition to the vertical transfer clock φp and the blooming restricting clock φAB.

The voltage level of the second horizontal transfer clock φs2 is changed by a driver 54. Then, the waveform of the second horizontal transfer clock φs2 is shaped by a matching circuit 55 consisting of a capacitor C and a resistor R before it is transmitted to the CCD17C via a horizontal transfer clock transmitting cable (to be abbreviated to a φs2 transmitting cable or a φs2 cable, hereinafter) 56.

Similarly to the first output signal Vout1 (which corresponds to the output signal Vout shown in FIG. 1 in the first conventional example), a second output signal Vout2 transmitted from the CCD17C is transmitted to a video signal processing circuit 45C via a output buffer transistor 57, a cable matching resistor 58 and a transmitting cable 59.

A CCD sort signal generating circuit 52C is provided in the above-described electron scope 2C at a position, for example, in a connector 60 of the electron scope 2C. When the connector 60 is connected to the video processor 5, the CCD sort signal generated by the CCD sort signal generating circuit 52C is supplied to the CCD discriminating circuit 53 so that the sort of the CCD 171 used in the connected electron scope 21 is discriminated.

The sort of the CCD 171 is classified by, for example, the difference in the number of pixels, or by a fact that the connected CCD is the horizontal 1-line reading type or the horizontal 2-line reading type.

According to the first embodiment, both the 1-line horizontal transfer type (the CCD17A used in the first conventional example shown in FIG. 2) and a 2-line horizontal and simultaneous transfer type (shown in FIG. 8A or 9) can be used.

Figure 2:
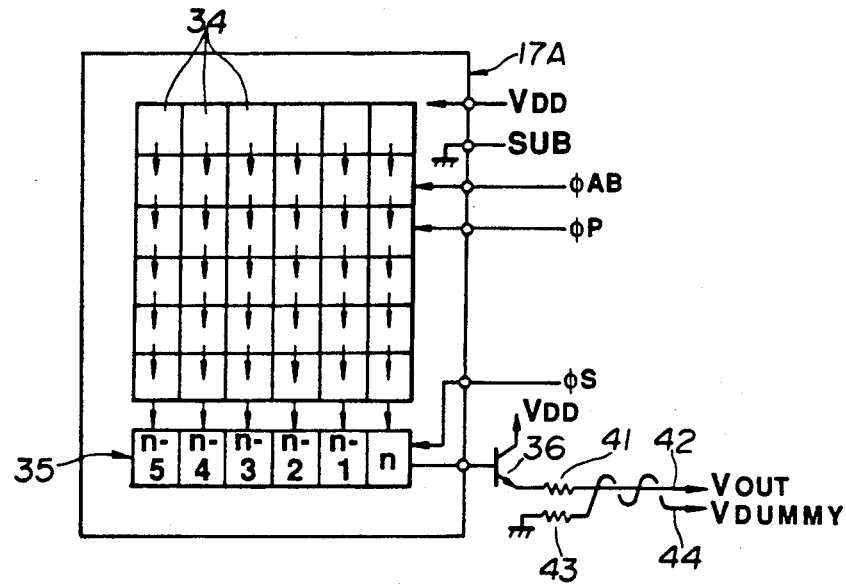
FIG. 2 illustrates the structure of a CCD.

The above-described 1-line horizontal transfer type CCD is the same as that shown in FIG. 2. The structure of the 2-line horizontal and simultaneous transfer type CCD17C is shown in FIG. 9.

The CCD17C is structured in such a manner that the horizontal transfer register 35 of the CCD17A shown in FIG. 2 is constituted by two horizontal transfer registers 35 and 61.

That is, the CCD17A shown in FIG. 2 is provided with one horizontal transfer register 35 and the CCD17C is constituted by the first and the second transfer registers 35 and 61 each of which is connected to the halved number of horizontal pixels. Therefore, the horizontal transfer from each of the first and the second transfer registers 35 and 61 is conducted by the corresponding clocks φs1 and φs2.

Figure 3:
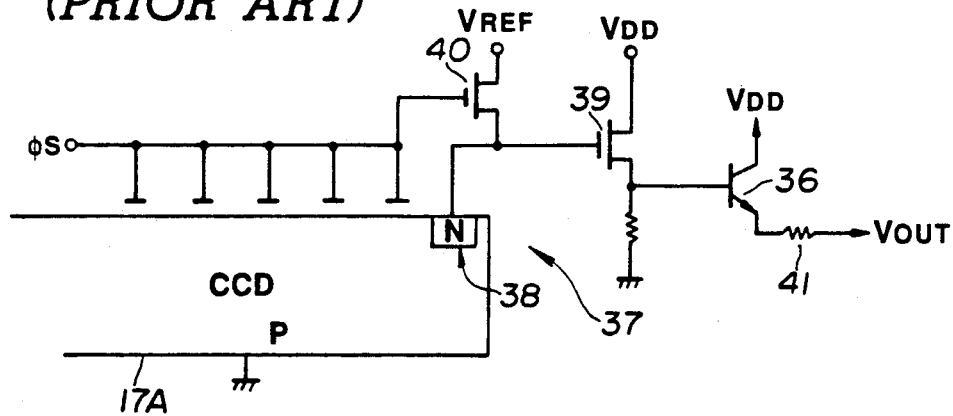
FIG. 3 is a circuit diagram which illustrates a charge detection circuit of the CCD.
Figure 4A:
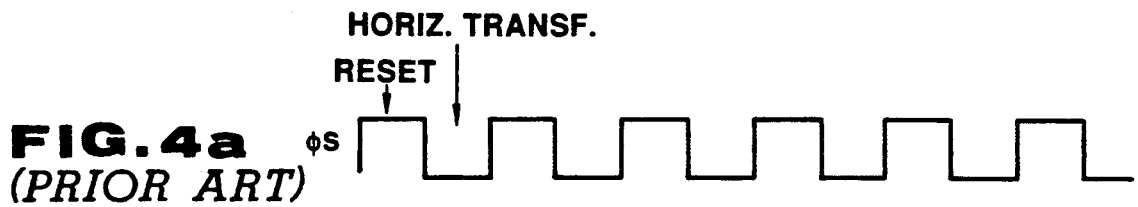
FIG. 4 illustrates the operation of the charge detection circuit of the CCD shown in FIG. 3.
Figure 4B:
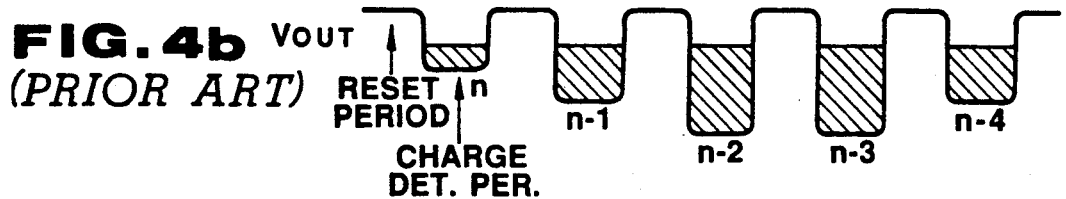

The structure of the output stage of the CCD in the portion adjacent to the FDA is arranged to have two structures shown in FIG. 3. That is, the reset terminal and the horizontal transfer terminal is commonly provided for the CCD so that the charge transfer from each of the horizontal transfer registers 35 and 61 and the resetting of the FDA are conducted by the same clocks φs1 and φs2.

Then, the structure and the operation of a CCD drive portion 62 will be described.

Pulses needed to drive the CCD17C are the following four pulses:

(1) φAB: which restricts blooming when light is made incident upon the CCD17C (2) φD: which transfers the charge stored in an exposure are of the CCD17C for each line in the vertical direction (3) φs1: which transfers the charge stored in the first horizontal transfer register 35 for each pixel (for example, 8 MHz) in the horizontal direction (4) φs2: which transfers the charge stored in the second horizontal transfer register 61 for each pixel in the horizontal direction Therefore, the blooming restricting clock φAB is supplied as shown in FIG. 10B and in synchronization with the irradiation of red, green and blue light from a light source portion 3. When each of light shade periods has come, the vertical transfer clock φp, the first horizontal transfer clock φs1 and the second horizontal transfer clock φs2 are supplied as shown in FIGS. 10C, 10D and 10E.

Thus, the charge stored in the CCD17C is transferred by the above-described clocks as designated by an arrow shown in FIG. 9.

FIGS. 10C', 10D' and 10E' illustrate timing of the clocks shown in FIGS. 10C, 10D and 10E in a further detailed manner.

As is shown from the above-described drawings, there are two features as follows:

The CCD17C features to have two horizontal transfer registers 35 and 61 so as to read the charge stored in each of pixels 34 at high speed.

The second feature lies in that the feed-through period can be formed in the waveform (to be abbreviated to "Vout waveform" hereinafter) of the output signal from the CCD17C by making each of the two horizontal transfer clocks φs1 and φs2 in the form of a trinary value.

Therefore, noise contained in the output signal from the CCD17C can be eliminated by obtaining the difference between the Vout waveforms, the difference being obtained by using a correlated double sampling circuit (that is, a CDS circuit) in the manner to be described later.

Then, each of drive circuits (each of circuits for generating a drive pulse) in the CCD drive portion 62 will be described.

Figure 11A:
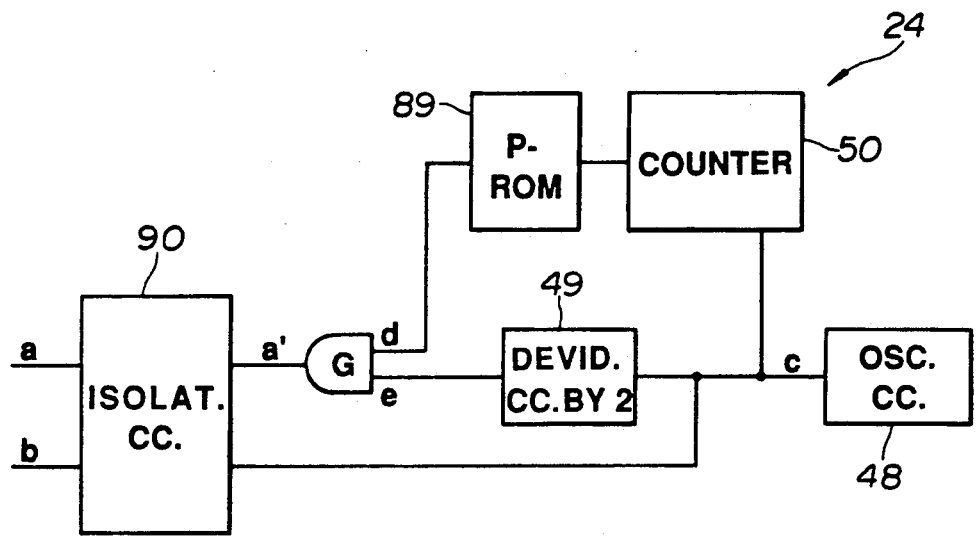
FIG. 11A is a structural view which illustrates a drive signal generating circuit.
Figure 11B:
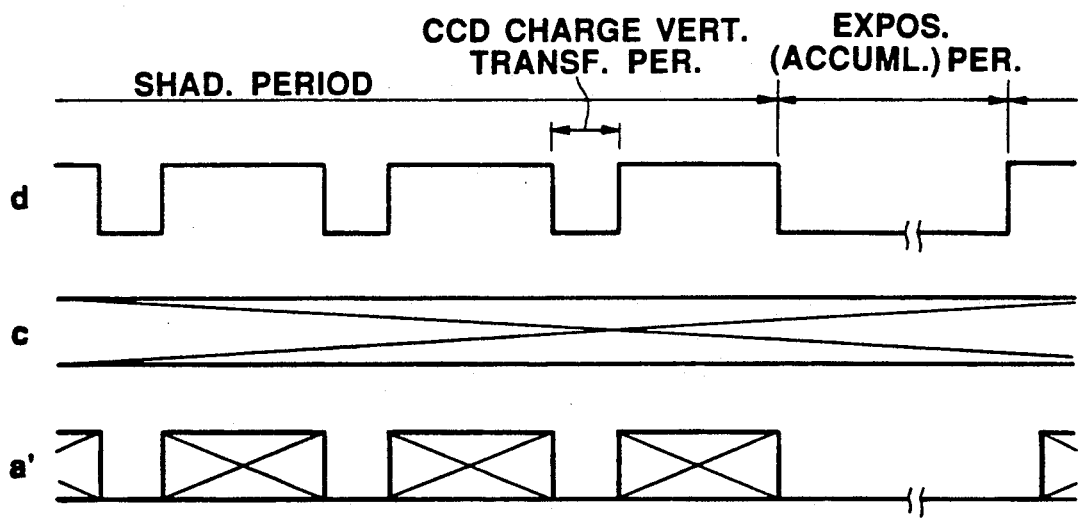
FIG. 11B illustrates the waveform of each of the portions of the drive signal generated by the drive signal generating circuit shown in FIG. 11A.

FIG. 11A illustrates the structure of the drive signal generating circuit 24, while FIG. 11B illustrates the waveforms of each of the portions.

As shown in FIG. 11A, a sole binary signal (for example, a 16 MHz binary signal) c transmitted from an oscillating circuit 48 is received by a ½ division circuit 49 and a counter 50. The output from the counter 50 is supplied to the address lines of a P-ROM 89 so that data is successively read from the P-ROM 89. The P-ROM 89 has previously stored data about the necessary output waveforms so as to output a signal represented by symbol d shown in FIG. 11B.

That is, the level of the signal d becomes the low level in only the exposure periods and the periods in which the stored charge is vertically transferred, while the signal d of the high level is transmitted in the other periods.

Then, the sole binary signal received by the above-described ½ dividing circuit 49 is halved (8 MHz) so that an output signal e is transmitted.

The output from the P-ROM 89 and that from the ½ dividing circuit 49 are supplied to an isolation circuit 90 via a NAND gate G.

An output signal a' from the NAND gate G causes an output signal e to be transmitted from the ½ dividing circuit 49 when the P-ROM 89 is at the high level as shown in a' of FIG. 11B.

The output signal a' from the NAND gate G and an output signal c from the oscillating circuit 48 are electrically isolated from each other by the isolation circuit 90 for the purpose of securing the safety for the patient so that the above-described two signals a' and c are converted into a signal a and a signal b.

Figure 11C:
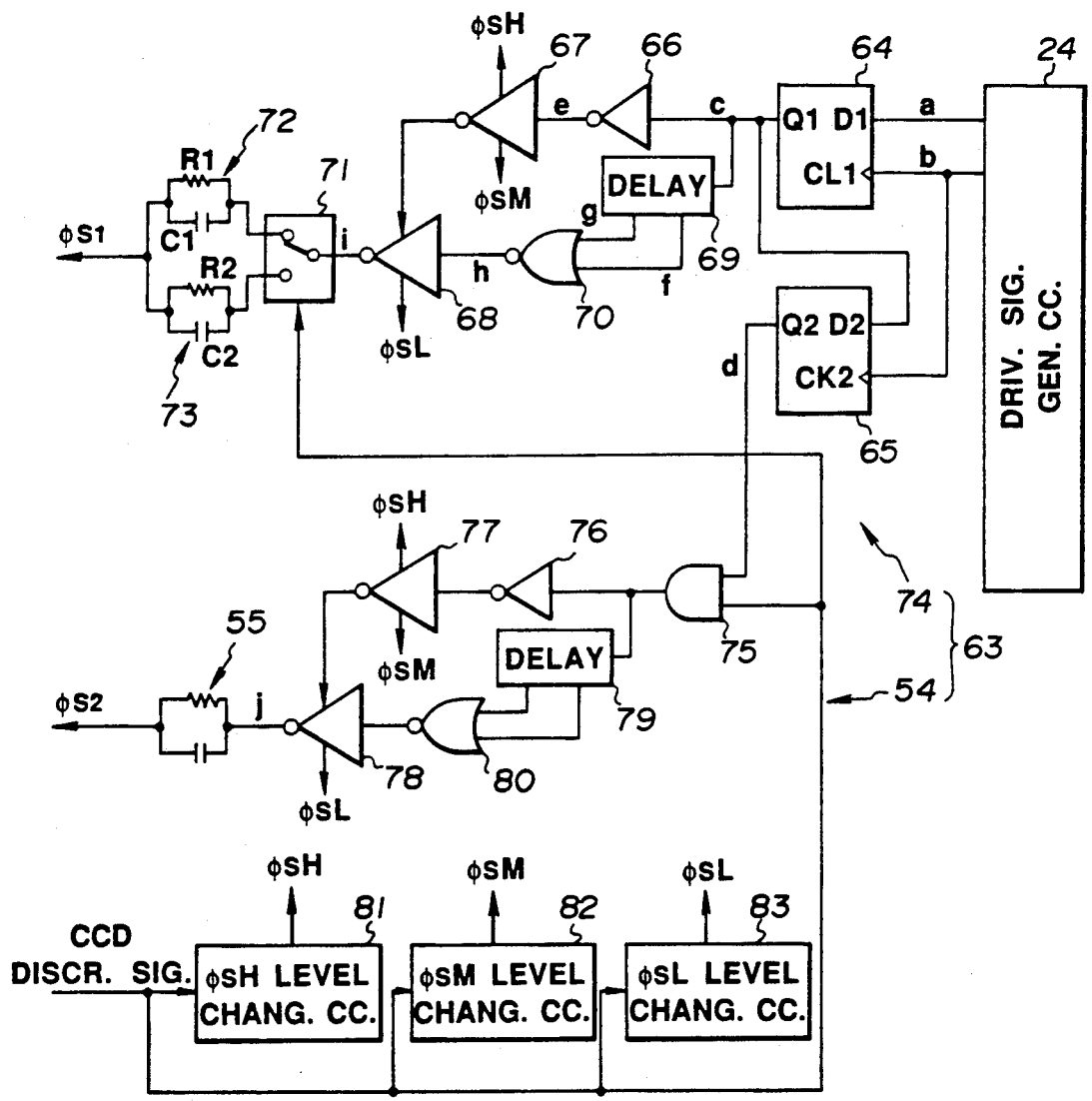
FIG. 11C is a circuit diagram, the circuit serving as means for generating a drive signal for horizontal transference.

The output signal a and b transmitted from the isolation circuit 90 are supplied to first and second D-type flip-flops 64 and 65 shown in FIG. 11C.

Figure 12:
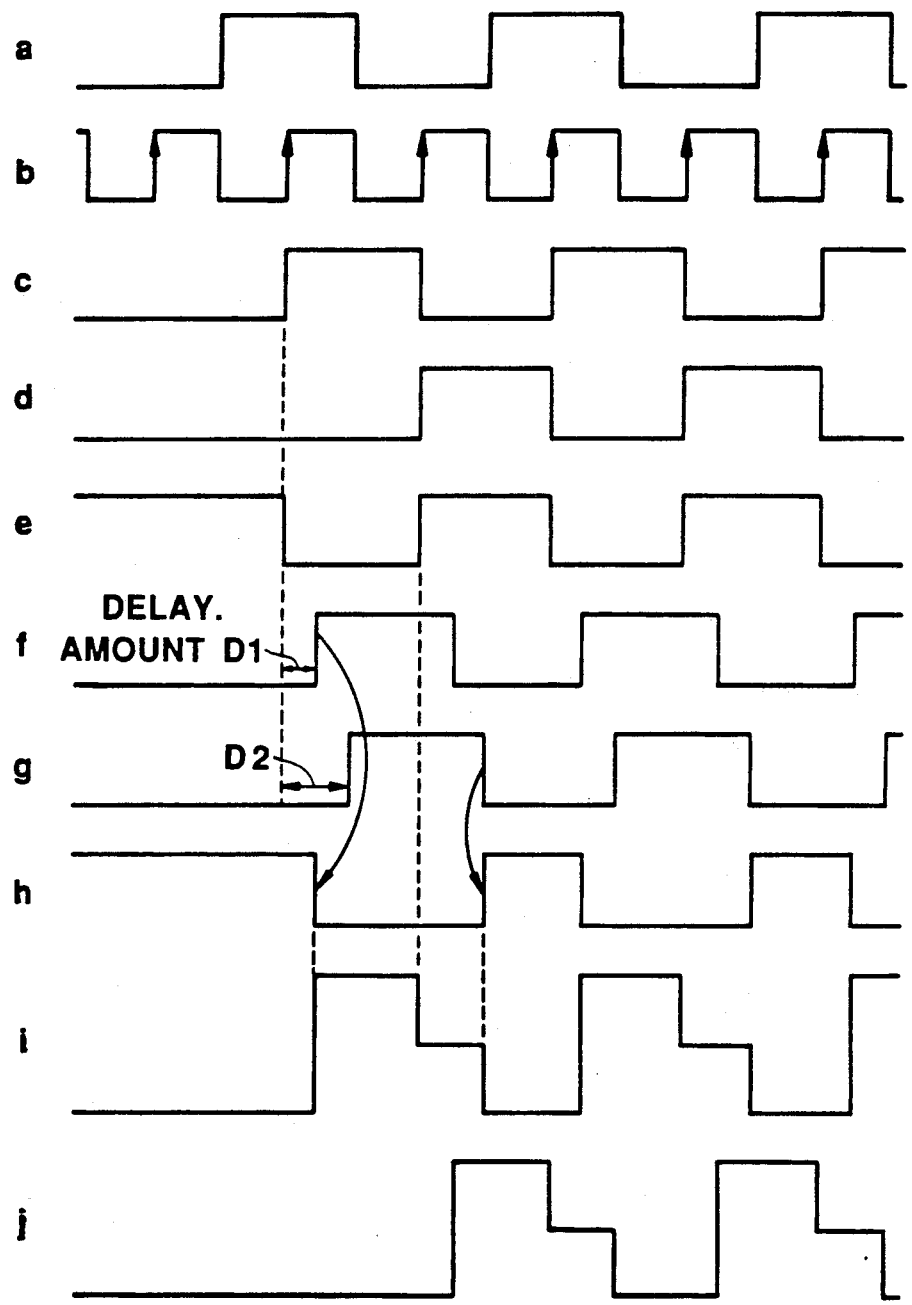

FIG. 11C illustrates the structure of a circuit ($\phi$s1 and $\phi$s2 drive circuit) 63 for generating horizontal transfer pulses $\phi$s1 and $\phi$s2. FIG. 12 illustrates a timing chart of the horizontal transfer pulses $\phi$s1 and $\phi$s2.

The signal a (for example, 8 MHz) shown in FIG. 2A and transmitted from the drive signal generating circuit 24 is latched by the first D-type flip-flop (to be abbreviated to a "FF" hereinafter) 64 at timing of the rising of a signal b (for example, 16 MHz) shown in b of FIG. 12. As a result, the sole signal c shown in c of FIG. 12 is transmitted from an output terminal Q1 of the FF 64. The signal c is again latched by a second D-type FF 65 at the rising timing of the signal b so that a sole binary signal d shown in d of FIG. 12 is transmitted from an output terminal Q2 of the FF 65. Therefore, the signals c and d holds the opposite-phase relationship to each other as shown in FIG. 12.

Then, the binary signal c is inverted when it passes through an inverter 66 so that the binary signal c is inverted to a signal e shown in e of FIG. 12, the signal e being then supplied to a first buffer circuit 67. The first buffer circuit 67 switches the high level voltage at the second buffer circuit 68, to be described later, at timing of the signal e. The signal c is delayed by a delay 69 so that signals f and g of different delays D1 and D2 are generated as shown in f and g of FIG. 12. When the signals f and g pass through a NOR gate 70, a signal h having a duty which is different from that of the signal e is generated.

The signal h is supplied to a second buffer circuit 68. An output signal i from the buffer circuit 68 is caused to be a trinary waveform as shown by i of FIG. 12 by combining the signals e and h. A truth table of this is shown in Table 1.

TABLE 1

| e | h | i |
|---|---|---|
| L | L | Trinary high level (to be called "$\phi$sH level" hereinafter) |
| L | H | Trinary low level (to be called "$\phi$sL level" hereinafter) |
| H | L | Trinary middle level (to be called "$\phi$sM level" hereinafter) |
| H | H | Trinary low level |

As is shown from the above-described circuit structure, the time periodical length of each of the $\phi$sH, $\phi$sM and $\phi$sL levels of the signal i can be optionally varied by changing timing of each of the signals e and h and the duty of the signal h.

The signal i transmitted from the second buffer circuit 68 passes through a switch 71 constituted by a relay or the like. The signal i is then supplied to a $\phi$s1 transmitting cable 30 via the first and the second cable matching circuits 72 and 73 constituted by corresponding capacitors C1 and C2 and resistors R1 and R2. Referring to FIGS. 8A and 8B, the FF 64 or the NOR gate 70 shown in FIG. 11 is expressed by a driver 80. FIG. 8A shows that the matching circuit 72 is selected in the case of the electron scope 2C, while FIG. 8B shows that the matching circuit 73 is selected in the case of the electron scope 2A.

On the other hand, a signal j is generated from the signal d similarly to the case where the clock $\phi$s1 is generated after the signal d has passed through an AND gate 75.

That is, the signal d is inverted by an inverter 76 after it has passed through the AND gate 75. The inverted signal d controls a fourth buffer circuit 78 via a third buffer circuit 77. On the other hand, it is supplied to the fourth buffer circuit 78 via a delay 79 and a NOR gate 80, the buffer circuit 78 transmitting the signal j.

The signal j is supplied to the $\phi$s2 transmitting cable 56 after it has passed through the third cable matching circuit 55.

Then, the processing for the voltage level and the cable matching constant of each of the horizontal transfer clocks $\phi$s1 and $\phi$s2 are switched in accordance with the sort of the CCD 17 or 17' will be described.

A signal for discriminating the CCD and transmitted from the above-described CCD discrimination circuit 53 is arranged to be logic "L" in the case of the 1-line horizontal transfer type CCD17A, while it is arranged to be logic "H" in the case of the 2-line horizontal and simultaneous transfer type CCD17C.

The CCD discrimination signal is supplied to $\phi$sH level switch circuit 81, a $\phi$sM level switch circuit 82, and a $\phi$sL level switch circuit 83, respectively. The above-described three switch circuits 81, 82 and 83 output $\phi$s drive signal levels (the $\phi$sH level, the $\phi$sM level and the $\phi$sL level) which are the most suitable for the above-described two types of the CCD17C and 17A in accordance with the CCD discrimination signal.

The CCD discrimination signal is also supplied to the switch 71 so that the first cable matching circuit 73 is selected in the case of the 1-line horizontal transfer type CCD17A, while the second cable matching circuit 72 is selected in the case of the 2-line horizontal and simultaneous transfer type CCD17C. Therefore, the most suitable cable matching circuit is selected to each of the two sorts of the CCDs 17C and 17A.

The CCD discrimination signal is also supplied to the AND gate 75. Therefore, when the 1-line horizontal transfer type CCD17A is connected, the output from it always becomes "L" and the signal j is also always becomes "L", causing the actual operations of the buffer circuits 77 and 78 to be stopped (for example, at 8 MHz).

Therefore, according to the above-described structure, the 1-line horizontal transfer type CCD17A is connected and the clocking of the $\phi$s2 buffers 77 and 78 is cancelled in the case where no clock $\phi$s2 is needed. As a result, a low power consumption type endoscope can be realized.

Figure 13:
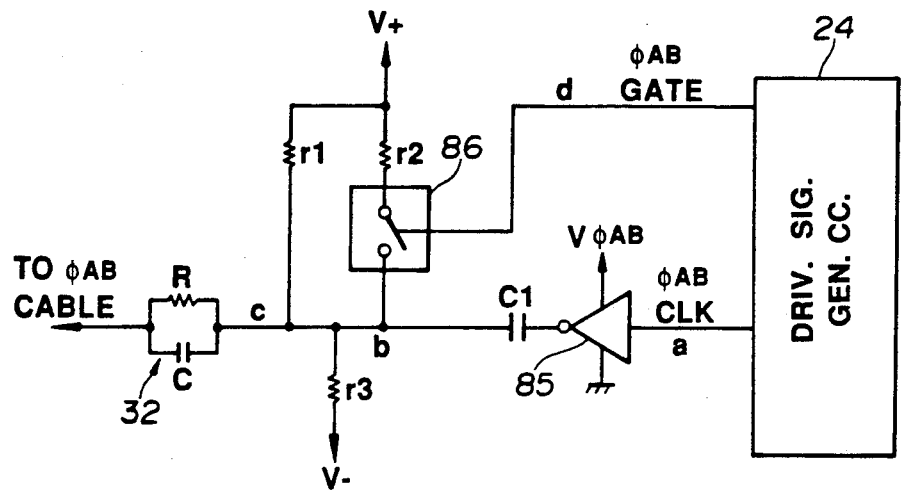
Figure 14:
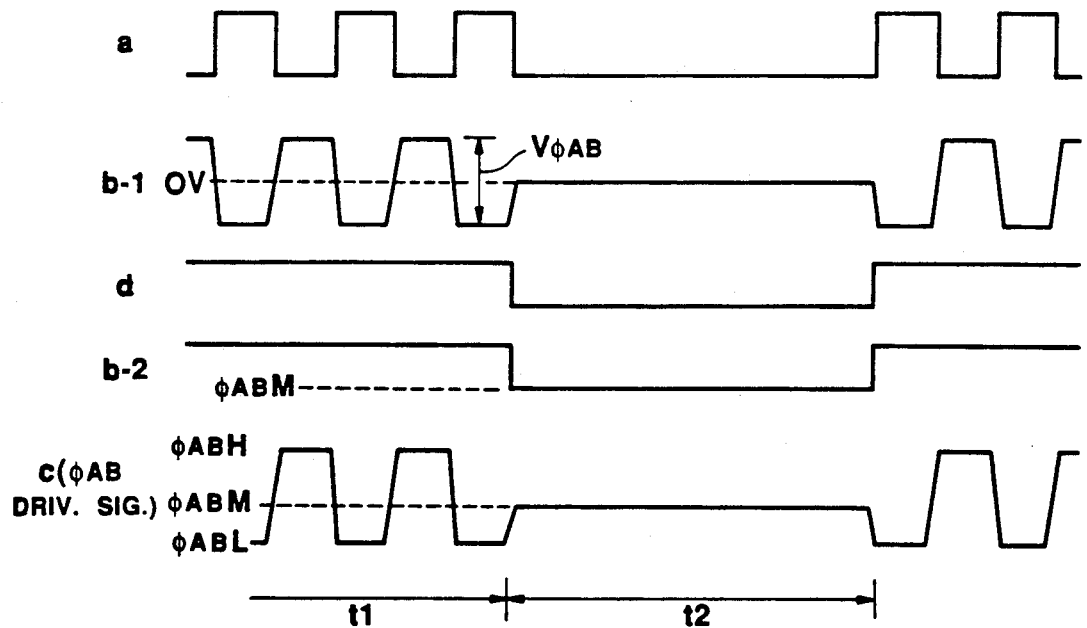

Then, the structure of a circuit (a $\phi$AB drive circuit) for generating the blooming restricting clock $\phi$AB is shown in FIG. 13, and the timing chart of the operation of $\phi$AB drive circuit is shown in FIG. 14.

It is necessary for the $\phi$AB drive signal waveform to be capable of clocking the portion between $\phi$ABH level and $\phi$ABL level in a period in which the clocking is conducted (that is, in a period t1) and to become $\phi$ABM level in the clock-stopped period, that is, in a period in which no clocking is conducted (expressed by t2).

Therefore, the signal a serving as the φAB clock and generated from the drive signal generating circuit 24 is supplied to a buffer circuit 85. The buffer circuit 85 transmits the signal a after it has converted the amplitude of the signal a into the amplitude (VφAB) which is necessary at the time of the clocking of the fAB clock. The output signal is transmitted to the next stage which is connected in an AC manner via the capacitor C1. Therefore, the AC component of the signal a becomes a signal represented by b-1 of FIG. 14.

A φAB gate signal generated by the drive signal generating circuit 24, that is, the signal d shown in d of FIG. 14 is supplied to an analog switch 86. The D.C. level of point b becomes as shown in FIG. 14b-2 b controlling the switching of the analog switch 86 in accordance with the signal d. That is, when the analog switch 86 is switched on (when the signal d is at "H"), the D.C. level of the point b becomes a value obtained by dividing voltage V+ and V− by resistances r1//r2 and r3. On the other hand, when the signal d is at "L" and the analog switch 86 is switched off, the D.C. level at the point b becomes a value obtained by dividing voltage V+ and V− by the resistances r1 and r3.

Thus, the waveform of the point b becomes waveform c formed by superimposing the A.C. component shown in FIG. 14b-1 and the D.C.component of b-2. The signal c is supplied to the φAB transmitting cable 33 via the matching circuit 32 consisting of a resistor R and a capacitor C.

Figure 15:
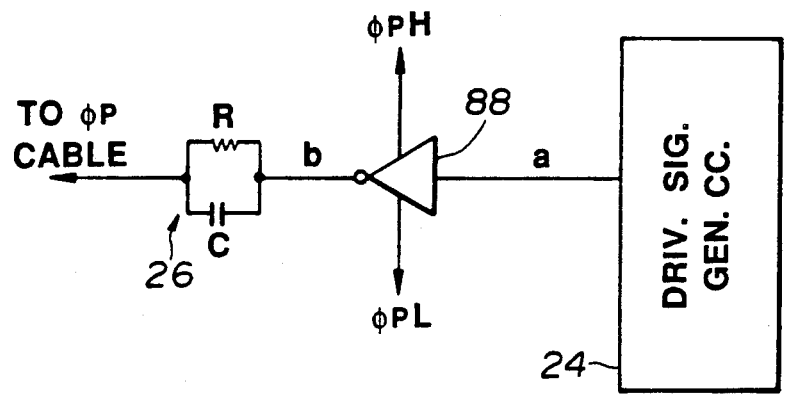
Figure 16:
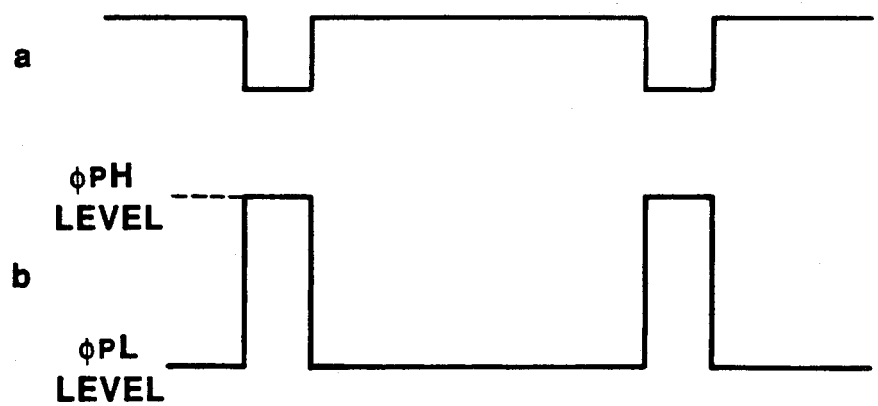

Then, the structure of the vertical transfer clock φp generating circuit (φp drive circuit) is shown in FIG. 15, and the timing of the vertical transfer clock φp is shown in FIG. 16.

The signal a shown in a of FIG. 16 and transmitted from the drive signal generating circuit 24 is converted into the signal b of a voltage level (the φpH level and the φpL level) which is necessary to drive the CCD17C or 17A by a buffer circuit 88. The signal b is supplied to the φp cable 27 via the matching circuit constituted by the resistor R and the capacitor C.

Since the structure of the FDA of the CCD17C is the same as that shown in FIG. 2, the description will be made with reference to FIG. 2. Each of the signals acts at timing shown in FIG. 17.

(A) in a period in which the horizontal transfer clock φs1 (the φs2 also applies) is at high level: the horizontal transfer register 35 does not transfer the charge to the FDA. In this case, the reset transistor 40 is turned on so that the FDA is reset to VREF level. In this case, the Vout becomes the reset level.

(B) in a period in which the φs1 (the φs2 also applies) is at medium level: the horizontal transfer transistor 35 does not transfer the charge to the FDA. The reset transistor 40 of the FDA is turned off. In this case, the Vout becomes the feed-through level.

(C) in a period in which the fs1 (the fs2 also applies) is at low level: the horizontal transfer register 35 transfers the Charge to the FDA. In this case, the reset transistor 40 of the FDA is turned off and the Vout becomes a charge detection level.

Symbols n, n-2, . . . represent the transference of even numbered pixels performed by the horizontal transfer resister 35, while n-1, n-3, . . . represent the same of even numbered pixels performed by the horizontal transfer register 61.

As described above, each of the CCD outputs Vout1 and Vout 2 contains the feed-through period.

Then, the structure of the video signal processing circuit 45 will be described with reference to FIG. 18.

The outputs Vout 1, the Vout2 and VDUMMY transmitted from the CCD17C are supplied to a fore-stage image processing circuit 90C in which the noise cancelling operation by the CDS processing is conducted and γ-character conversion by the γ-correction processing is conducted. Then, it is supplied to an A/D converter 92 via a switch 91.

Then, the outputs are analog-digital converted by the A/D converter 92 before they are supplied to a frame memory 93R for red, a frame memory 93G for green and a frame memory 93B for blue.

Video data for red, green and blue light is written in the corresponding frame memories 93R, 93G and 93B for the corresponding colors.

The video data in the frame memories 93R, 93G and 93B is simultaneously read so as to be video data of the corresponding color components. Then, video data for each of the colors is digital-to-analog converted by D/A converters 94a, 94b and 94c before being then transmitted to a rear-stage image processing circuit 95.

In the rear-stage image processing circuit 95, frame exaggeration processing and the like is conducted. Then, a TV signal is transmitted to the monitor 6. Thus, a good quality image of the endoscope can be observed on the monitor 6.

Figure 19A:
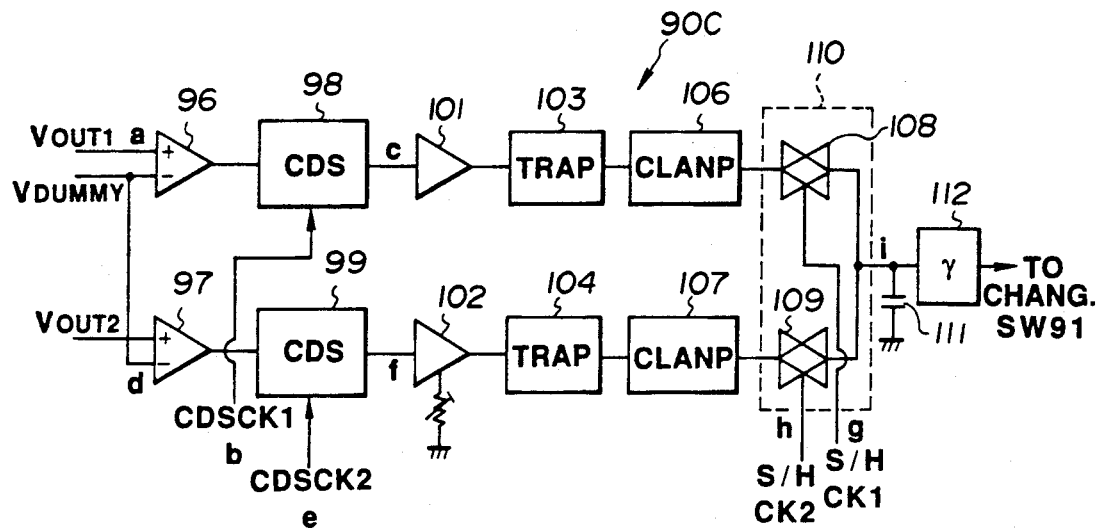
FIGS. 19A and 19B illustrate the structure of a fore-stage image processing circuit.

Then, the structure of the fore-stage image processing circuit 90C is shown in FIG. 19A, and the waveforms of each of the signals are shown in FIG. 20.

Similarly to the embodiment shown in FIG. 8A or 9, the output from the CCD17C is current-amplified by the transistors 36 and 37 before being supplied to the fore-stage image processing circuit 90C through the cables 42 and 59. The signals Vout1 and Vout2 supplied to the fore-stage image processing circuit 90C are subjected to a processing for obtaining a difference signal from the dummy output signal VDUMMY by differential amplifiers 96 and 97. The induced noise of the same phase which is being transmitted through the cable in the scope 2C is eliminated by the differential amplifiers 96 and 97, then the signals Vout1 and Vout 2 are supplied to CDS circuits 98 and 99 in the next stage.

In the CDS circuits 98 and 99, noise (reset noise) contained in the output from the CCD is eliminated by obtaining the difference between the level of the feed-through period in the output signals Vout1 and Vout2 and the level of the charge detection period.

The CDS circuits 98 and 99 are arranged to have the same structure to which the CDS clock signals (CDSCK1 and CDSCK2) are supplied and the CDS processing is conducted in the CDS circuits 98 and 99 in synchronization with the CDS clock signals CDSCK1 and CDSCK2.

That is, the feed-through level of the output signal Vout1 (or Vout2) shown in FIG. 20a (or 20d ) is sampled/held at the rising timing of the above-described clocks as shown in FIG. 20b (or 20e). Then, the charge detection level is sampled/held at the last transition timing. Thus, the level difference between the two levels is obtained so as to output the signal c (or f) denoting the difference. Therefore, the reset noise is, as described above, eliminated from the output from each of the CDS circuits 98 and 99. Furthermore, the basic clock (the carrier component which is 8 MHz here) contained in the input signals, that is, Vout1 and Vout2 is eliminated.

The voltage level of each of the output signals c and f from the CDS circuits 98 and 99 is amplified by amplifiers 101 and 102 at the next stage. Then, the gain of either of the amplifiers 101 and 102, for example, the amplifier 102 is adjusted by a trimmer resistance so that the output from each of the CDS circuits 98 and 99 is adjusted so as to become the same output level when the same input signal is supplied.

The signals which have passed through the amplifiers 101 and 102 are supplied to trap circuits 103 and 104, respectively. The trap circuits 103 and 104 are arranged to have the structure shown in FIG. 21

An emitter of an input transistor Tr1 is provided with a resonance circuit 105 comprising a coil LO and a capacitor CO. The resonant frequency of the resonance circuit 105 is arranged to be the frequency of each of the CDS clock signals CDSCK1 and CDSCK2 (that is, 8 MHz). The output from the resonant circuit 105 is grounded via a resistor r4 and is also supplied to the base of a transistor Tr2 at the next stage. An emitter of the transistor Tr2 is grounded via a resistor r5 and is also connected to the output terminal.

The trap circuits 103 and 104 are provided for the purpose of eliminating spike-like noise generated in the CDS circuits 98 and 99.

That is, since the spike-like noise generated in the CDS circuit 98 (or 99) is mixed in the trap circuit 103 (or 104) as shown in FIG. 22a, the spike-like noise is trapped in the resonance circuit 105 by causing it to pass through the trap circuit 103 (or 104). As a result, a signal from which the spike-like noise has been eliminated can be obtained as shown in FIG. 22b.

The signals which have passed through the trap circuits 103 and 104 are respectively supplied to clamp circuits 106 and 107 in which each of the D.C. component is regenerated. The output signal from each of the clamp circuits 106 and 107 are multiplexed by a multiplexer 110 constituted by analog switches 108 and 109.

That is, as shown in g and i of FIG. 20, the analog switch 108 is switched on when a clock signal S/HCK1 is 'H". The input signal at this time is caused to be sampled in a capacitor 111. When the clock signal S/HCK1 then becomes 'L" and the analog switch 108 is switched off, the sampled voltage level can be held.

Then, the other analog switch 109 is switched on when the clock signal S/HCK2 is raised to 'H". The input signal f at this time is caused to be sampled in the capacitor 111.

If the clock signal S/HCK2 is switched off, the voltage level can be held. Thus, signals of the waveforms shown in FIG. 20i can be obtained by repeating the above-described operations. The $\gamma$-character of the signal i is corrected by a $\gamma$-correction circuit 112 before being transmitted to the A/D converter 92 at the next stage via the switch 91.

The switching operation of the switch 91 is controlled by the output signal from the CCD discrimination circuit 53.

Figure 19B:
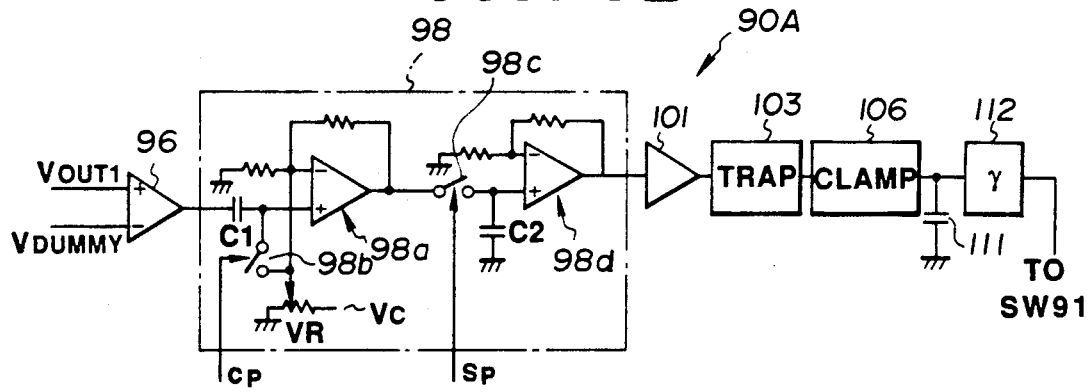

That is, if it is determined that the CCD17C is used, the fore-stage image processing circuit 90C shown in FIG. 19A is selected. On the other hand, if it is determined that the CCD17A is used, the fore-stage image processing circuit 90A shown in FIG. 19B is selected.

The fore-stage image processing circuit 90A has the same structure as either of the fore-stage image processing circuits 90C shown in FIG. 19A from which the multiplexer 110 is removed.

The output from the differential amplifier 96 is amplified by the first differential amplifier 98a constituting the CDS circuit after the output has passed through the capacitor c1. A reference voltage is supplied to an inverted input terminal of the amplifier 98a via a variable resistor VR, while the non-inverted input terminal is connected to the inverted input terminal via the first switch 98b. The switch 98b is switched on by a clamp pulse cp of the rising edge of the CDSCK1 shown in FIG. 19C.

The output from the amplifier 98a is supplied to a second differential amplifier 98d via a second switch 98c.

The non-inverted input terminal of the amplifier 98d is grounded via the capacitor c2.

Figure 19C:
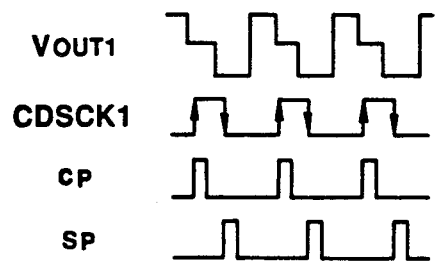
FIG. 19C illustrates the operation of the fore-stage image processing circuit shown in FIG. 19B.

The second 98c is switched on by a sample pulse sp of the last transition edge of the CDSCK1 shown in FIG. 19C.

The first switch 98b is switched on by the clamp pulse cp in the feed-through period so that the input terminal of the first differential amplifier 98a is short-cut. The level of the input signal is zero at this time, and the capacitor c1 is charged at the output level from the differential amplifier 96 in this state, causing the thus charged level to be maintained after the clamp pulse cp has been turned off. Therefore, in the signal period after the feed-through period, the difference from the level maintained in the capacitor c1 is detected so as to supplied to the differential amplifier 98a. The differential signal level is retained in the capacitor c2 when the sample pulse sp is turned on. The differential signal retained in the capacitor c2 is amplified by the differential amplifier 98c so as to be transmitted to the amplifier 101 at the next stage.

According to the first embodiment, the feed-through period is formed in the output signal from the CCD17C or 17A which resets the horizontal transfer and the charge detection by the sole drive signal, the output signal being read by a trinary signal of the sole drive signal. The CDS processing is conducted in the CDS circuits 98 and 99 by using the CCD output signal in the feed-through period. Therefore, reset noise or the like contained in the CCD output signal can be eliminated and an excellent S/N video signal can be obtained. Therefore, a good quality image of the subject can be obtained on the monitor 6.

According to the first embodiment, one transmitting cable can be commonly used for both the resetting transmitting cable and the horizontal transfer clock transmitting cable. Furthermore, the CDS processing can be conducted. As a result, an excellent video signal can be obtained by the electron scope 2C or 2A having a thin portion to be inserted or a front end portion. Furthermore, according to the first embodiment, since the most suitable drive signal can be transmitted to the employed CCD17C or 17A, the driving can be conducted under the most suitable conditions.

Then, a second embodiment of the present invention will be described with reference to FIGS. 23 to 26.

The major difference from the first embodiment lies in a fact that the $\phi s1$ and $\phi s2$ are arranged to be the same phase.

According to the first embodiment, $\phi s1$ and $\phi s2$ are driven at the opposite phases in the $\phi s1$ and $\phi s2$ drive circuit 63 (see FIG. 11C). In a $\phi s1$ and $\phi s2$ drive circuit 121 shown in FIG. 23, the same phase $\phi s1$ and $\phi s2$ are generated with which the CCD17C is driven.

Figure 23:
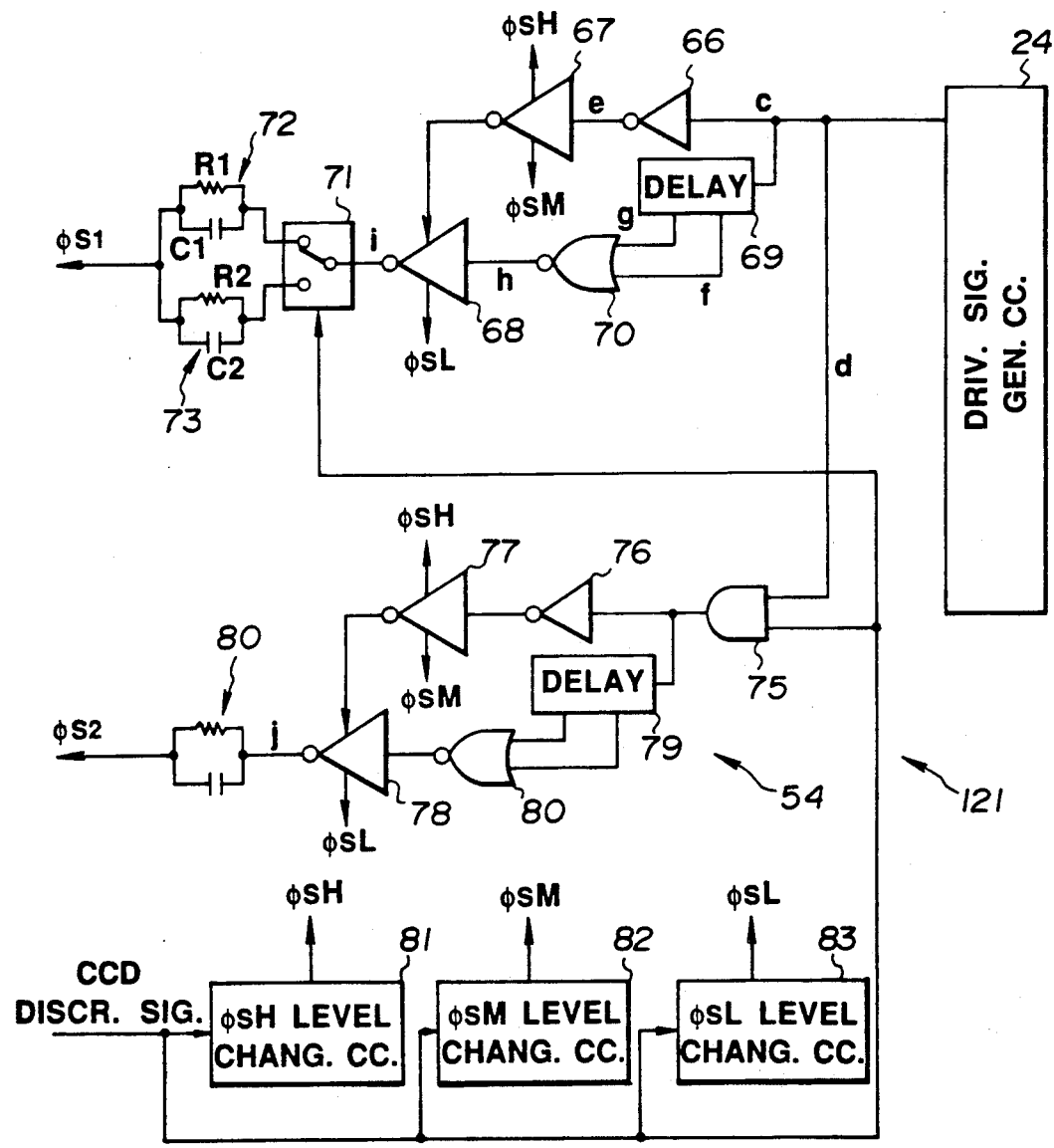
FIG. 23 is a circuit diagram which illustrates the means for generating a drive signal for horizontal transfer according to the second embodiment of the present invention.
Figure 24:
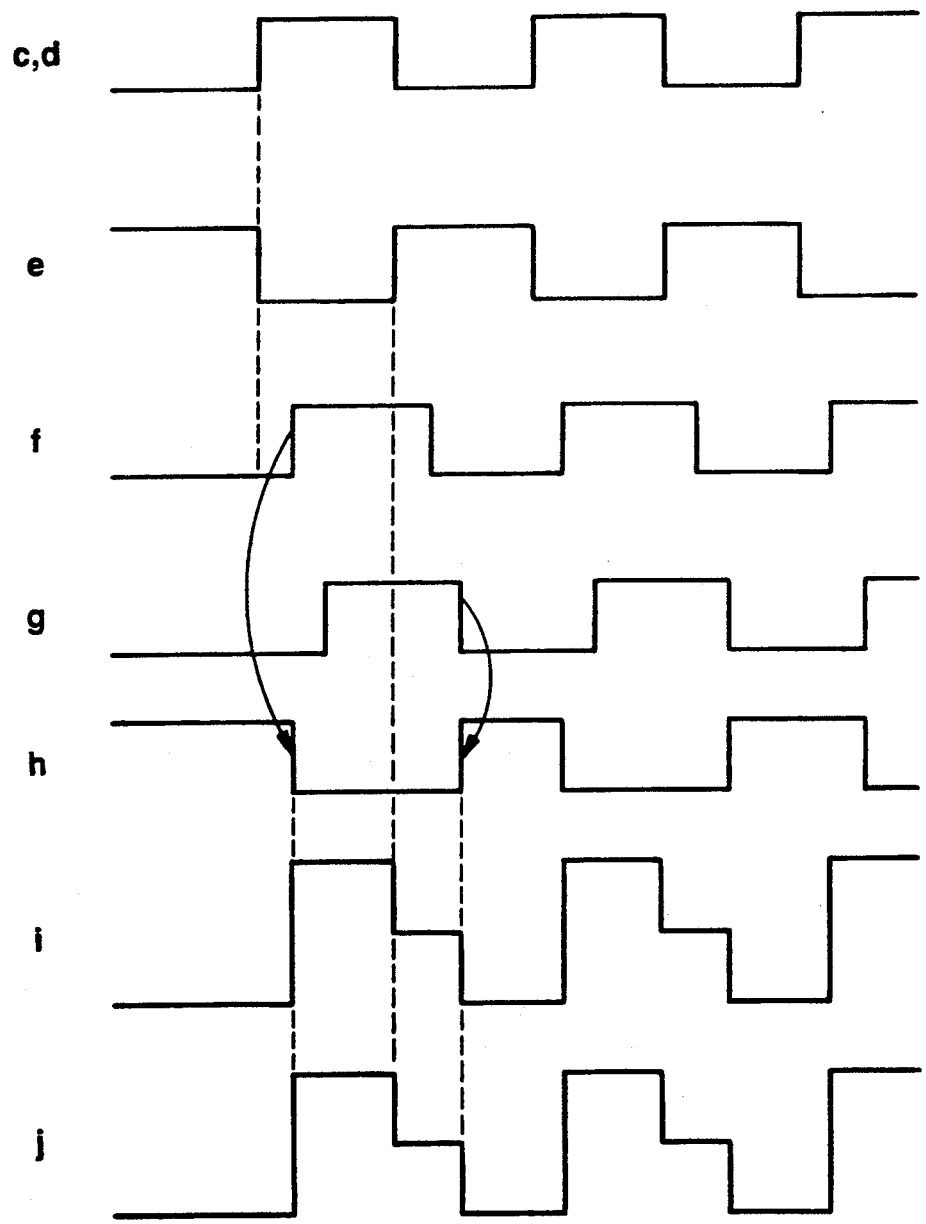
FIG. 24 illustrates timing of the operation performed by the means for generating a drive signal for horizontal transfer shown in FIG. 23.

That is, the structure shown in FIG. 23 is constituted by removing the first and the second D-type FFs 64 and 65 shown in FIG. 11C. Therefore, the signals c and d are, as shown in FIG. 24, made the same signals and the final signals i and j are also made the same timing signals.

As described above, the horizontal transfer clocks $\phi s1$ and $\phi s2$ are drive signals of the same phase according to the structure according to this embodiment.

Figure 25:
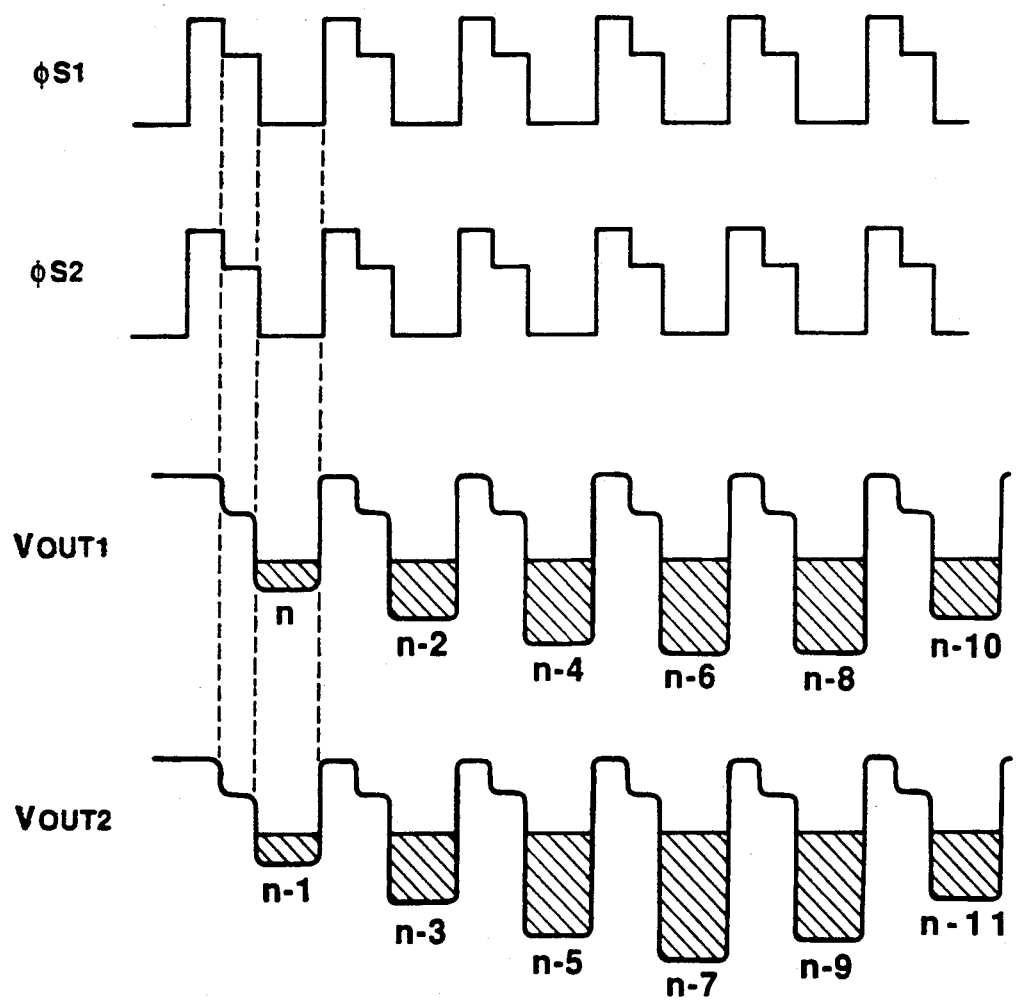
FIG. 25 the waveform of a drive signal for trinary horizontal transference and an output signal from the CCD.

Since the above-described clocks $\phi s1$ and $\phi s2$ are in the form of a trinary valued drive waveform similarly to those according to the first embodiment, each of the signals Vout1 and Vout2 transmitted from the CCD contains the feed-through period. However, the output signals Vout1 and Vout2 become, as shown in FIG. 25, the same phase waveform since the clocks $\phi s1$ and $\phi s2$ are the same phase as described above.

The video signal processing system to which the signals Vout1 and Vout2 transmitted from the CCD are supplied has the same structure as that shown in FIG. 18. However, a fore-stage image processing circuit 90C' is employed which is partially different from the fore-stage image processing circuit 90C shown in FIG. 19.

The structure of the fore-stage image processing circuit 90C' according to the second embodiment is shown in FIG. 26.

In the circuit 90C', a delay line 122 is provided next to the second CDS circuit 99 in the circuit 90C shown in FIG. 19A. The delay line 122 allows the phase of each of the output signals Vout1 and Vout2 to be delayed so as to make them to be the opposite phases. As a result, the superimposing operation of the signal performed in the multiplexer 110 at the next stage can be conducted easily. The structure next to the delay line 122 is arranged to be the same as that according to the first embodiment.

The CDS clock signals to be supplied to the CDS circuits 98 and 99 employ the common CDSCK1.

The other structure is arranged to be the same as that of the first embodiment and therefore substantially the same operation is realized except for the arrangement that the phase of the clock $\phi s1$ and that of $\phi s2$ are made the same, and similar effect can be obtained.

Figure 27:
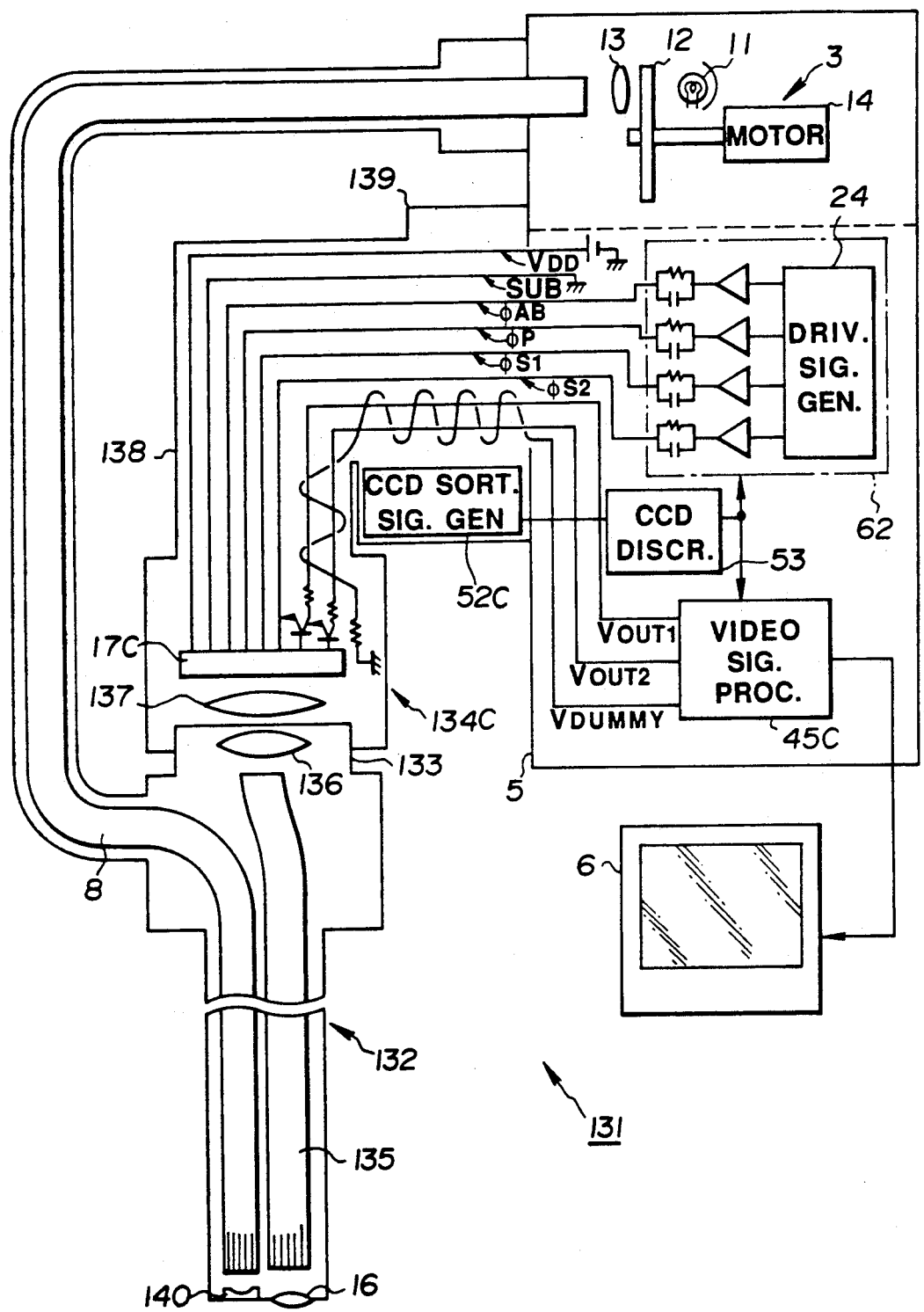
FIG. 27 illustrates the overall structure of a third embodiment of the present invention.

FIG. 27 illustrates an electron endoscope apparatus 131 according a third embodiment of the present invention.

According to this embodiment, the electron scope 2C according to the first embodiment is replaced by a camera-equipped scope comprising a fiber scope 132 and a TV camera which is fastened to an ocular portion 133 of the fiber scope 132 from outside.

The fiber scope 132 is arranged in such a manner that the incidental surface of an image guide 135 is located on the focal plane of the object lens 16. Thus, the optical image is transmitted to the irradiation surface of the ocular portion 133 through the image guide 135. The ocular portion 133 includes an ocular 136 so that the optical image which has passed through the ocular 136 can be visually observed with the eyes of a user. Since the detachable TV camera 134 C is equipped as shown in the drawing, the image can be formed on the CCD17C (or 17A) via an imaging lens 137 of the TV camera 134C.

The TV camera 134 C can be connected to the video processor 5 with a connecter 139 of a cable 138 thereof connected to the CCD17C (or 17A) and extending toward the video processor 5. Furthermore, since the light guide 8 is connected to the video processor 5, illumination light is supplied from the light source portion 3 to the fiber scope 132. As a result, light can be irradiated to the subject from the light irradiation side via an light distribution lens 140.

The electrical processings performed in the third embodiment are conducted similarly to those performed in the first embodiment. As an alternative, the processings according to the second embodiment can be employed.

FIG. 2 illustrates an electron endoscope 151 according to the fourth embodiment.

According to the above-described first to the third embodiments, the apparatus of the plane successive type apparatus, that is the electron scope 2C (or 2A), the TV camera 134C, and the plane successive type video processor 5 are employed. Furthermore, the line transfer type CCD are employed to serve as the CCD17C or 17A. However, according to the fourth embodiment, a simultaneous type apparatus is formed. That is, a simultaneous type scope 2' and a simultaneous type video processor 5' are employed. Furthermore, according to this embodiment, an inter-line type CCD152 is employed.

Figure 29:
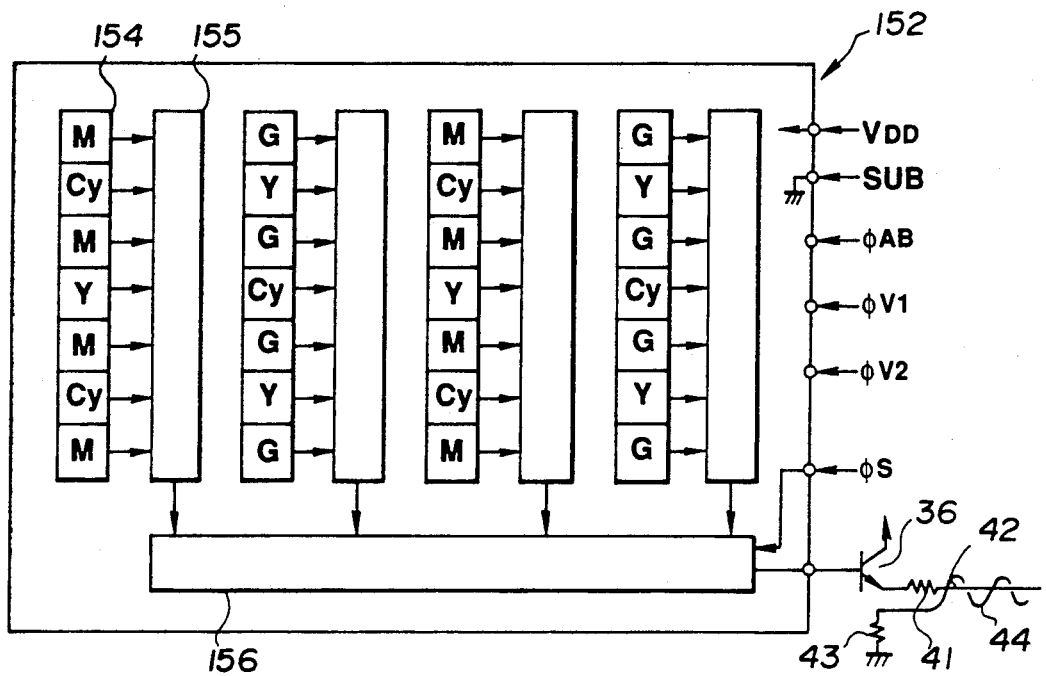
FIG. 29 illustrates the structure of the CCD according to the fourth embodiment.

The structure of the CCD 152 is shown in FIG. 29.

The CCD 152 comprises a photo-diode portion 154 the front surface of which is provided with a mosaic filter 153 (see FIG. 28), a vertical transfer CCD portion 155 and a horizontal transferring CCD portion 156.

The front surface of the photo-diode 154 is provided with color filters of magenta (M), cyan (Cy), yellow (Y) and green (G) arranged in a mosaic manner. Therefore, the charge generated by exposing the photo-diode via each of the color filters is transferred to a horizontal transfer CCD portion 156 by vertical transfer clocks $\phi v1$ and $\phi v2$ via the vertical transfer CCD portion 155.

The charge in the horizontal transfer CCD portion 156 is transferred horizontally by the horizontal transfer clock $\phi s$ serving as the $\phi s$ drive signal so as to be transmitted to the Vout cable 42 via the transistor 36 and the matching resistor 41.

In order to serve as the horizontal transfer clock $\phi s$, the trinary horizontal transfer clock $\phi s$ according to the first embodiment may be employed.

Therefore, the CCD output signal Vout contains the feed-through period.

Figure 28:
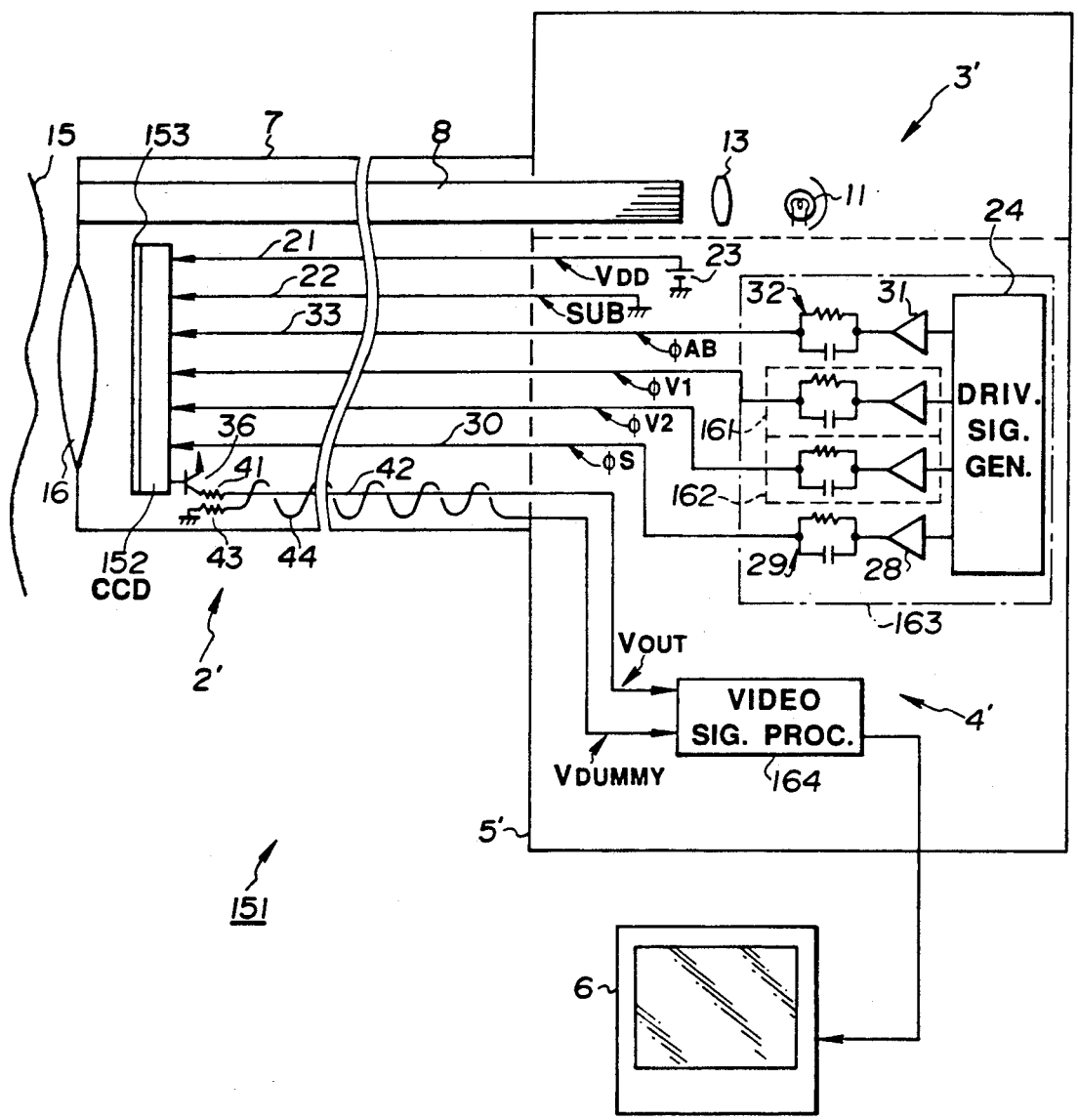
FIG. 28 illustrates the overall structure of a fourth embodiment of the present invention.

As shown in FIG. 28, according to this embodiment, its light source portion 3' is formed by removing the motor 14 and the rotary filter 12 from the light source portion 3 shown in FIG. 8A so that white light is supplied to the light guide 8.

Figure 30:
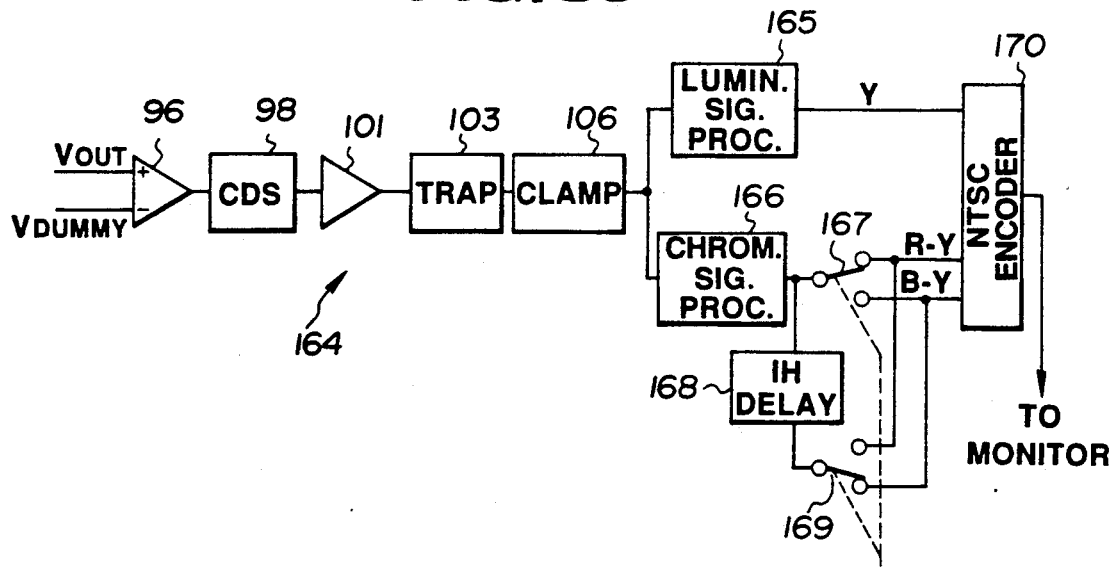
FIG. 30 is a block diagram which illustrate the video signal processing circuit according to the fourth embodiment.

A signal processing portion 4 is arranged to comprise a CCD drive portion 163 formed by using $\phi v1$ and $\phi v2$ drive circuits 161 and 162 for transmitting 2-phase drive signals $\phi v1$ and $\phi v2$ as an alternative to the using of the $\phi p$ drive circuit of the CCD drive portion 62 shown in FIG. 8A. The video signal processing circuit 45C shown in FIG. 8A is replaced by a video signal processing circuit 164 shown in FIG. 30.

The structure from the differential amplifier 96 to the clamp circuit 106 is arranged to be the same as the structure shown in FIG. 19B. That is, since the CCD152 is arranged to be the 1-line horizontal transfer type CCD, the time-division superimposing circuit by the multiplexer 110 or the like shown In FIG. 19B is omitted here.

A signal transmitted from the clamp circuit 106 is supplied to a brightness signal processing circuit 165 in which a brightness signal Y is generated. Furthermore, it is also supplied to a color signal processing circuit 166 in which line successive color differential signal R−Y/B−Y is generated. The color signal R−Y/B−Y is a line successive signal R−Y and B−Y alternates every 1H, and is made simultaneous color differential signals R−Y and B−Y by a switch 167, a 1H delay 168 and a switch 169.

The thus obtained brightness signal Y and the color differential signals R−Y and B−Y are supplied to an NTSC encoder 170 in which they are converted into composite video signal so as to be transmitted to the monitor 6.

According to this embodiment, an apparatus using simultaneous type color imaging means is used is described, the apparatus having the substantially the similar effect obtained in the first embodiment.

In the case of the simultaneous type apparatus, the 2-line horizontal and simultaneous reading type CCD can also be used.

Furthermore, the line transfer type CCD can be employed in the case of the simultaneous type apparatus. In this case, it is preferable that the lamp 11 of the light source portion 3′ to be turned off during the CCD read period or to be shaded by a shading plate or the like.

As an alternative to the electron scope 2′ according to the fourth embodiment, a structure may be employed in which a simultaneous TV camera is mounted on the ocular portion of the fiber scope.

Figure 31:
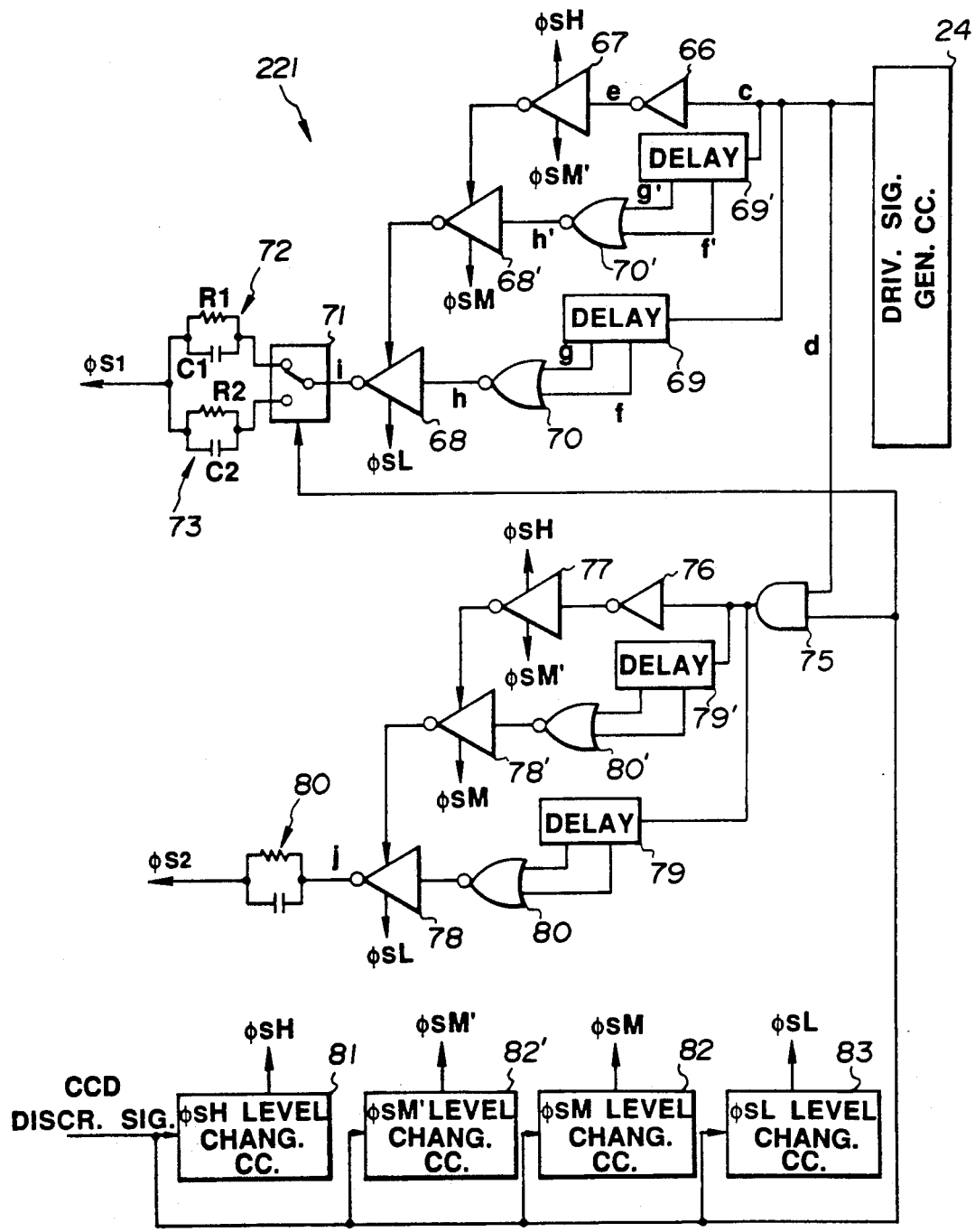
FIG. 31 is a circuit diagram which illustrates the means for generating a drive signal for horizontal transference.

FIG. 31 illustrates a $\phi s1$ and $\phi s2$ drive circuit 221 according to a fifth embodiment of the present invention.

Figure 32:
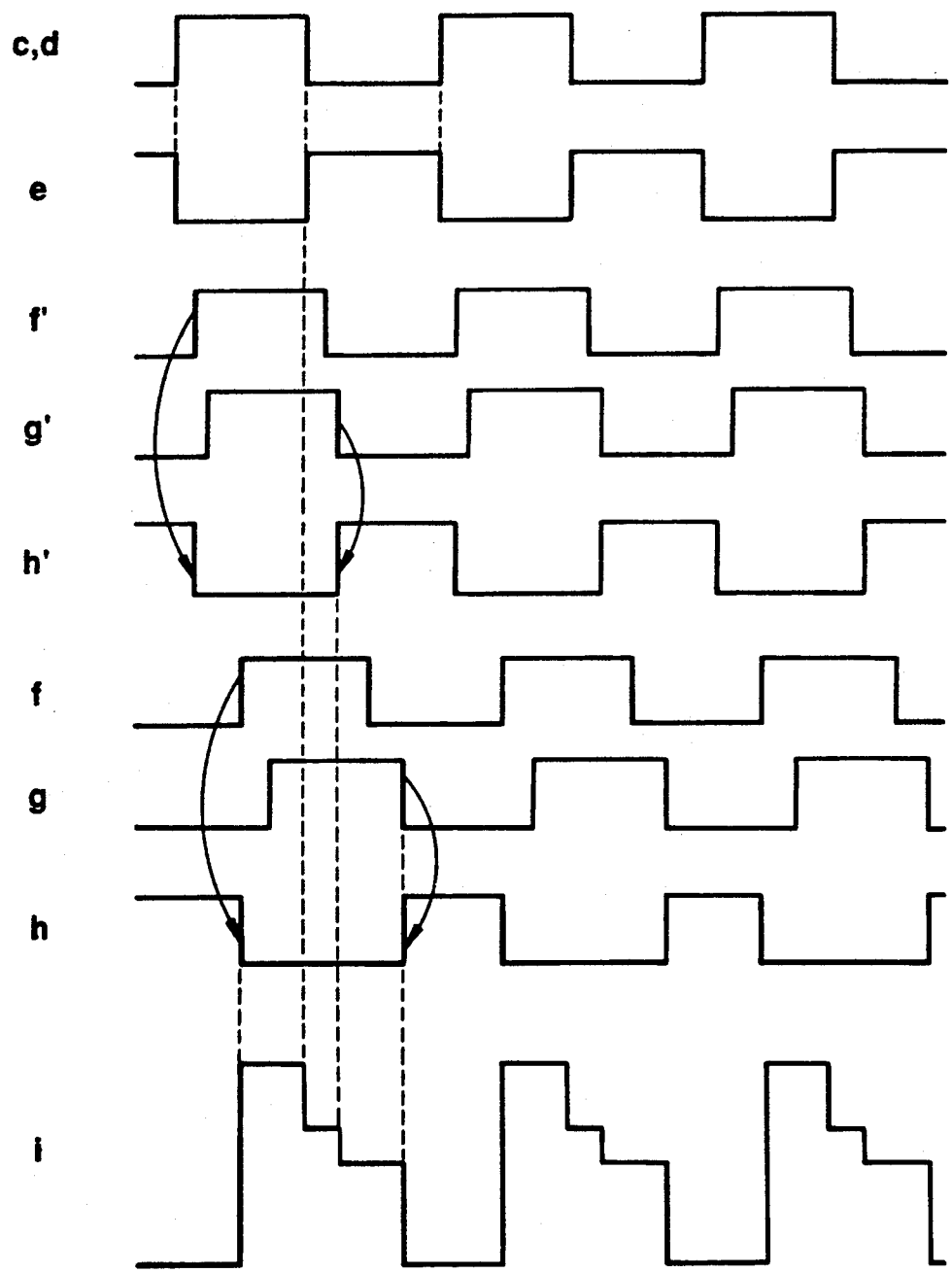
FIG. 32 illustrates the waveforms so as to describe the operation of the means for generating a drive signal for horizontal transference shown in FIG. 31.
Figure 33:
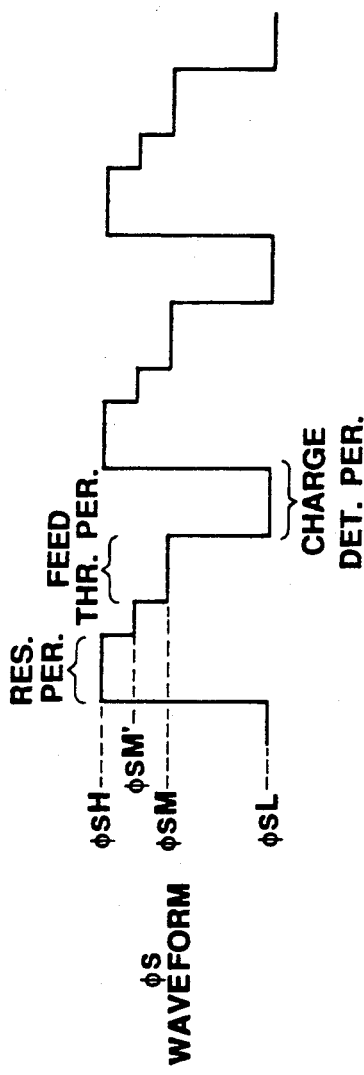
FIG. 33 illustrates the waveforms of the driving signal for horizontal transference according to a fifth embodiment.

According to this embodiment, the $\phi s$ waveform is, as shown in i of FIG. 32 and FIG. 33, arranged to be a quadrinary waveform. In the case where the $\phi s$ waveform is arranged to be the trinary waveform, the spike-like noise can be inevitably mixed in the feed-through period of the Vout waveform if the level is rapidly changed from the reset level to the feed-through level. The problem of this type can be overcome by arranging the waveform to be the quadrinary waveform according to this embodiment.

The $\phi s1$ and $\phi s2$ drive circuit 221 shown in FIG. 31 is arranged in such a manner that the voltage of high level of the second buffer circuit 68 of the $\phi s1$ and $\phi s2$ drive circuit 121 shown in FIG. 23 is switched by the output from the first buffer circuit 67 and a fifth buffer circuit 68′ is interposed so as to switch the high level of the second buffer circuit 68 with the output from the thus interposed fifth buffer circuit 68′.

Furthermore, the high level voltage of the fourth buffer circuit 78 is switched by the output of the third buffer circuit 77 and a sixth buffer circuit 78′ is interposed so as to switch the high level of the fourth buffer circuit 78 with the output from the thus interposed sixth buffer circuit 78′.

The output signal c from the drive signal generating circuit 24 is supplied to a delay 69′ in which signals f′ and g′ are generated as shown in FIG. 32. The signals f′ and g′ are supplied to a NOR gate 70 in which a signal h′ is generated. The signal h′ is supplied to a fifth buffer circuit 68′. The high level of the second buffer circuit 68 is switched by the output signal from the fifth buffer circuit 68′. The high level of the fifth buffer circuit 68′ is switched by an output signal from the first buffer circuit 67.

On the other hand, the signal which has passed through the AND gate 75 passes through the delay 79′ and the NOR gate 80′. Then, the signal is supplied to the sixth buffer circuit 78′. The output signal from the sixth buffer circuit 78′ switches the high level of the fourth buffer circuit 78. The high level of the sixth buffer circuit 78′ is switched by the output signal from the third buffer circuit 77.

The low level of the first buffer circuit 67 and that of the third buffer circuit 77 are supplied from a $\phi sM'$ level switch circuit 82′. The low level of the fifth L buffer circuit 68′ and that of the sixth buffer circuit 78′ are supplied from a $\phi sM$ level switch circuit 82.

Figure 34:
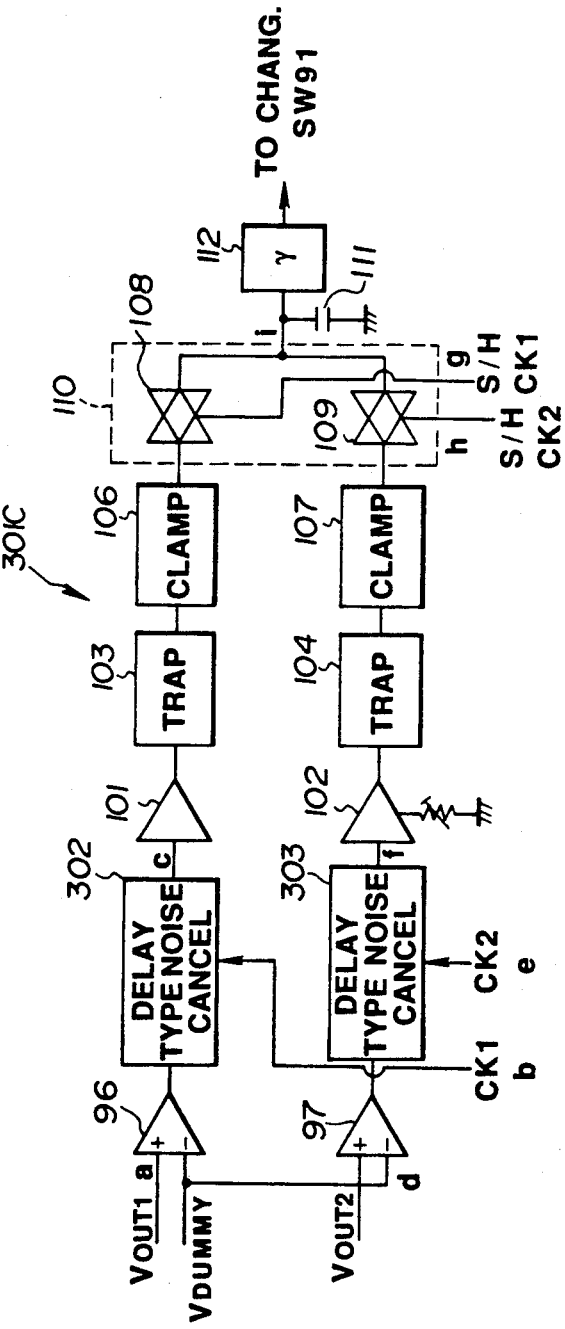
FIG. 34 is a block diagram which illustrates the structure of the fore-stage video signal processing circuit according to the fifth embodiment of the present invention.

A fore-stage image processing circuit 301C according to the sixth embodiment shown in FIG. 34 is arranged in such a manner that the reset noise is eliminated by using delay type noise eliminating circuits 302 and 303. The fore-stage image processing circuit 301C can be used as an alternative to the fore-stage image processing circuit 90C according to the first embodiment shown in FIG. 19A. That is, the structure according to this embodiment is formed by simply replacing the CDS circuits 98 and 99 shown in FIG. 19A by the delay type noise eliminating circuits 302 and 303.

The structure of the delay type noise eliminating circuits 302 and 303 is shown in FIG. 35.

As shown in FIG. 36a, the Vout1 transmitted from the CCD is directly supplied to a differential circuit 304, and is also delayed by a predetermined time TO by a delay circuit 305 so as to be converted into a Vout1′ shown in FIG. 36b before being supplied to the differential circuit 304. In the differential circuit 304, a difference signal s between the two signals Vout1 and Vout1′ is obtained, the difference signal s is sampled/held in the next sample/hold circuit 306 at the last transition of the clock CK1 shown in FIG. 36C. As a result, a signal U shown in FIG. 36d is transmitted to the following stage as an output signal from the delay type noise eliminating circuit 302.

The time period TO delayed by the delay circuit 305 is arranged to cause the substantial central portion of the charge detection period of the signal Vout1 to coincide with the substantial center of the feed-through period. Therefore, the value of the two signals Vout1 and Vout1′ containing reset noise and whose feed-through level is subtracted from the charge detection level is sampled/held by sampling/holding, for example, the signal Vout1 at the last transition of the clock CK1 which synchronizes with the charge detection period of the signal Vout1. As a result, a signal level from which reset noise is eliminated is transmitted from the sample/hold circuit 306. The predetermined time period TO delayed by the delay circuit 305 may be arranged so as to cause the charge detection period in the signal Vout1 and the feed-through period to overlap each other in terms of the time, and the sampling may be conducted within the thus overlapped time period.

The other operations are conducted similarly to those conducted in accordance with the first embodiment.

It is apparent that the delay type noise eliminating circuit 302 can be applied to the other embodiments.

Figure 37:
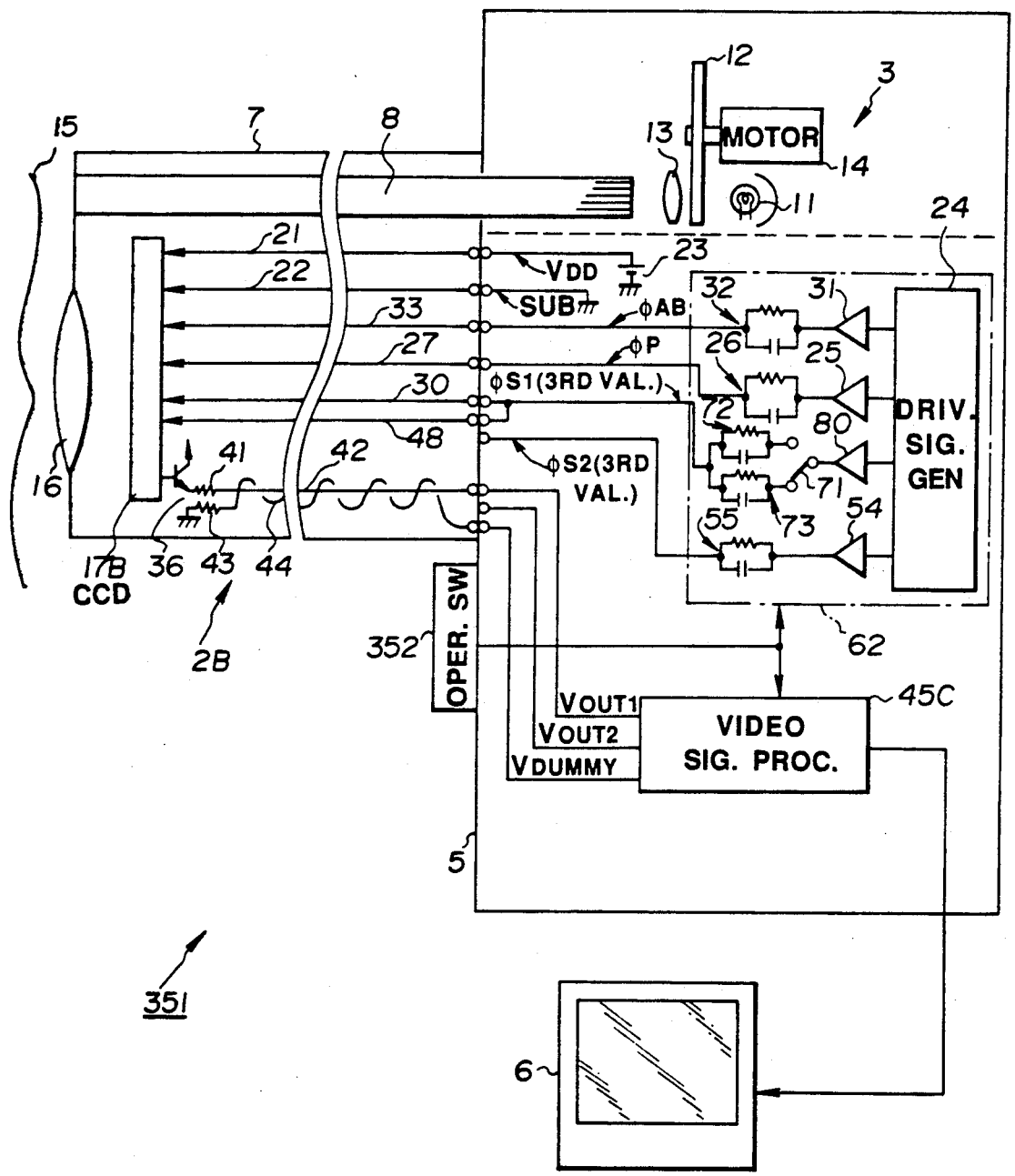
FIG. 37 illustrates the structure of an electron endoscope apparatus according to a sixth embodiment of the present invention.

FIG. 37 illustrates an electron type endoscope 351 according to a sixth embodiment of the present invention.

Figure 5:
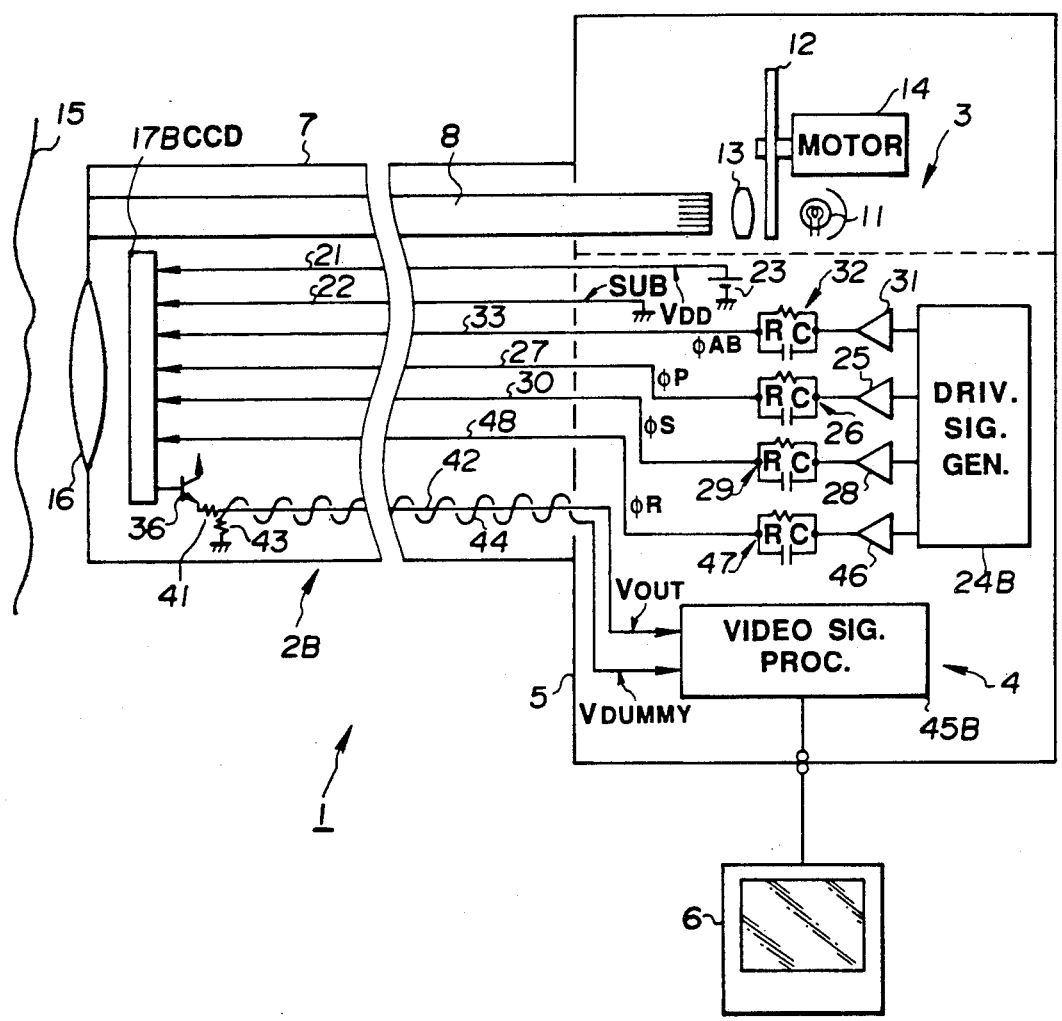
FIG. 5 illustrates the overall structure of a second conventional example.

The electron type endoscope 351 according to the sixth embodiment can, of course, be used in the electron scopes 2A and 2C according to the first embodiment, and it may also be used in the electron scope 2B (see FIG. 5) including the CCD7B in which the reset terminal and the horizontal transfer terminal are separated from each other.

That is, in the case of the electron scope 2B having the CCD7B whose two terminals are separated from each other, a common trinary horizontal transfer drive signal φs1 is supplied to the two terminals.

According to this embodiment, an advantage can be obtained in that the structure can be used in a conventional electron scope 2B.

According to this embodiment shown in FIG. 37, the operations of the switch 71 and the like are switched by a manual switch 352.

As described above, a common signal processing system can be employed to conduct the signal processing in both the case of the scope arranged to use the CCD (for example, 2B), in which the terminal for the resetting operation and the terminal for conducting the horizontal transferring are independently provided, as its imaging means and the case of the CCD (17A and 17C) in which the above-described two terminals are arranged to be a common terminal. Furthermore, noise contained an output signal from the CCD can be eliminated by its CDS circuit or the like.

Although the description is made about the CCD, the present invention can be similarly applied to a solid imaging device comprising a terminal for the resetting operation and a terminal for conducting the horizontal transferring.

The above-described embodiments may be partially combined with each other to form a novel embodiment.

As described above, according to the present invention, the charge coupled device for conducting both the charge resetting operation and the horizontal transferring with a common drive signal is arranged to output a signal containing the feed-through period. As a result, noise can be eliminated from the charge coupled device by a small number of signal transmitting cables.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An electron endoscope apparatus comprising:
    an electron endoscope having an elongated portion to be inserted, an objective optical system disposed at the front portion of said portion to be inserted, a solid imaging device constituted by a photo-electrical conversion portion for photo-electrically converting an optical image formed by said objective optical system and a charge detection circuit for converting a signal charge which has been photo-electrically converted by said photo-electrical conversion portion into a voltage level so as to output said voltage level, and light irradiating means disposed at said front portion of said portion to be inserted and for irradiating illumination light for illuminating a subject;
    a signal processing circuit having a binary signal generating circuit means for generating a sole binary signal, a multi-valued drive signal generating circuit means for generating a multi-valued drive signal exceeding a trinary value for commonly conducting both a horizontal transfer of said signal charge of said photo-electrical conversion portion and a resetting of said charge detection circuit with said binary signal and for causing said solid imaging device to output a signal containing a feed-through signal period, a signal extraction circuit for extracting a signal component by making a reference with a signal level in said feed-through signal period with said signal transmitted from said solid imaging device, and a video signal processing circuit for generating a standard video signal by processing a signal transmitted from said signal extraction circuit; and
    display means for displaying said standard video signal transmitted from said signal processing circuit.

2. An apparatus according to claim 1, wherein said solid imaging device is a charge coupled device.

3. An apparatus according to claim 1, wherein said electron endoscope is an electron endoscope in which said solid imaging device is disposed on a focal plane of said object lens.

4. An apparatus according to claim 1, wherein said electron endoscope is a TV camera equipped scope comprising an optical scope whose one end is disposed on a focal plane of said object lens and has an image guide for transmitting an optical image to another end and a TV camera fastened to an ocular portion of said optical scope and includes said solid imaging device.

5. An apparatus according to claim 1, wherein said drive signal generating circuit has switch means for transmitting a second drive signal which causes a second solid imaging device which is a different sort from said solid imaging device to be driven.

6. An apparatus according to claim 5, wherein a second electron endoscope including said electron endoscope and said second solid imaging device has means for generating a sort signal which corresponds to a sort of said solid imaging device or a sort of said second solid imaging device.

7. An apparatus according to claim 6, wherein said signal processing circuit discriminates said sort signal and controls said switch means so as to cause said multi-valued drive signal which is suitable for said discriminated solid imaging device.

8. An apparatus according to claim 5, wherein said second-solid imaging device is arranged to be different from said solid imaging device in at least the number of pixels and the number of registers in said horizontal transfer register.

9. An apparatus according to claim 1, wherein said electron endoscope has a color filter for separating color at a front surface of said photo-electrical conversion portion.

10. An apparatus according to claim 1, wherein said light irradiating means is constituted by a light guide for transmitting light supplied from an external light source device to an end thereof and for irradiating light from another end thereof disposed at a front portion of said portion to be inserted.

11. An apparatus according to claim 1, wherein said light irradiating means irradiates white light.

12. An apparatus according to claim 1, wherein said light irradiating means is plane-successive light irradiating means for irradiating light of different wavelength region in a time sequential manner.

13. An apparatus according to claim 1, wherein said drive signal generating circuit comprises a vertical transfer signal generating circuit for transmitting a vertical transfer signal for said vertical transfer to said solid imaging device and a horizontal transfer signal generating circuit for transmitting a multi-leveled horizontal transfer signal exceeding a trinary value to said solid imaging device.

14. An apparatus according to claim 13, wherein said horizontal transfer signal generating circuit outputs a horizontal transfer signal of at least trinary valued levels:

- a first level in which said charge of said photoelectrical conversion portion is not transferred to said charge detection circuit and said charge detection circuit is reset;
- a second level in which said resetting of said charge detection circuit is released, said charge of said photo-electrical conversion portion is transferred to said charge detection circuit, and a signal corresponding to said charge is transmitted from said charge detection circuit; and
- a third level between said first and second levels and in which said charge of said photo-electrical conversion portion is not transferred to said charge detection circuit, said resetting of said charge detection circuit is released, and a feed-through signal which does not correspond to said charge of said photo-electrical conversion portion is transmitted from said charge detection circuit.

15. An apparatus according to claim 13, wherein said horizontal transfer signal generating circuit outputs a horizontal transfer signal further having a fourth level between said first level and said third level.

16. An apparatus according to claim 13, wherein said horizontal transfer signal generating circuit comprises a second horizontal transfer signal generating circuit for transmitting a second multi-valued horizontal transfer signal in addition to said multi-valued horizontal transfer signal.

17. An apparatus according to claim 1, wherein said signal extraction circuit is a correlated double sampling circuit constituted by clamp means for clamping a signal in said feed-through signal period, and sampling means for sampling said signal in a signal period in which a signal corresponding to a charge transferred from said photo-electrical conversion portion via said charge detection circuit.

18. An apparatus according to claim 1, wherein said signal extraction circuit is a delay type noise eliminating circuit constituted by delay means for delaying said signal transmitted from said solid imaging device so as to cause said feed-through signal period of said delayed signal and a not-delayed signal and a signal period in which a signal corresponding to said charge transferred from said photo-electrical conversion portion via said charge detection circuit is transmitted to overlap each other in terms of time, difference signal generating means for obtaining a difference signal from said signal delayed by said delay means and said not-delayed signal, and sampling means for sampling said difference signal at the time at which said feed-through signal and said signal period overlaps in terms of time.

19. An apparatus according to claim 17 or 18, wherein said signal extraction circuit comprises a second correlated double sampling circuit or a second delay type noise eliminating circuit in addition to said correlated double sampling circuit or said delay type noise eliminating circuit.

20. An apparatus according to claim 17 or 18, wherein said signal extraction circuit comprises a trap circuit for eliminating a sampling clock for use is said correlated double sampling circuit or said delay type noise eliminating circuit.

21. An apparatus according to claim 1, wherein said video signal processing circuit conducts a signal processing in accordance with said solid imaging device of which a color separating color filter is fastened.

22. An apparatus according to claim 1, wherein said multi-valued drive signal is commonly applied to said horizontal transfer terminal and said reset terminal of said electron endoscope whose horizontal transfer terminal and said reset terminal are separated from each other.

23. A solid imaging device signal processing apparatus for reading a signal and processing said read signal from a solid imaging device having a photo-electrical conversion means for conducting a photo-electrical conversion and a charge detection circuit for transmitting a signal charge stored in said photo-electrical conversion portion as a signal whose voltage level corresponds to a quantity of said signal charge, said solid imaging device signal processing apparatus comprising:

- a solid imaging device drive circuit having a binary signal generating circuit means for generating a sole binary signal, a vertical transfer signal generating circuit means for transmitting a vertical transfer signal for a vertical transfer to said photo-electrical conversion portion with said binary signal, and a horizontal transfer signal generating circuit means for commonly transmitting a multi-valued horizontal transfer signal exceeding a trinary value for causing said charge detection circuit and said photoelectrical conversion portion to transmit a signal containing a feed-through signal period;
- a signal extraction circuit for extracting a signal component in a signal period, in which a signal component which corresponds to said signal charge is transmitted, with reference to a signal level of said feed-through signal period with respect to a signal transmitted from said solid imaging device by said multi-valued horizontal transfer signal; and
- a video signal processing circuit for generating a standard video signal by processing said signal transmitted from said signal extraction circuit.

24. An apparatus according to claim 23, wherein said signal extraction circuit is a correlated double sampling circuit comprising clamp means for clamping a signal level of said feed-through signal period, and sampling means for sampling said signal level in said signal period.

25. An apparatus according to claim 23, wherein said signal extraction circuit is a delay type noise eliminating circuit constituted by delay means for delaying said signal transmitted from said solid imaging device so as to cause said feed-through signal period of said delayed signal and a not-delayed signal and a signal period to overlap each other in terms of time, difference signal generating means for obtaining a difference signal from said signal delayed by said delay means and said not-delayed signal, and sampling means for sampling said difference signal at the time at which said feed-through signal and said signal period overlaps in terms of time.

26. An apparatus according to claim 24 or 25, wherein said signal extraction means comprises a second correlated double sampling circuit or a second delay type noise eliminating circuit in addition to said correlated double sampling circuit or said delay type noise eliminating circuit.

27. An apparatus according to claim 24 or 25, wherein said signal extraction circuit comprises a trap circuit for eliminating a sampling clock for use in said correlated double sampling circuit or said delay type noise eliminating circuit.

28. An apparatus according to claim 23, wherein said video signal processing circuit conducts a signal processing in accordance with said solid imaging device to which a color separating color filter is fastened.

29. An apparatus according to claim 23, wherein said video signal processing circuit conducts a signal processing in accordance with said solid imaging device to which no color separating color filter is fastened.

30. An apparatus according to claim 23, wherein said horizontal transfer signal generating circuit means outputs a horizontal transfer signal of at least trinary valued levels:
- a first level in which said charge of said photoelectrical conversion portion is not transferred to said charge detection circuit and said charge detection circuit is reset;
- a second level in which said resetting of said charge detection circuit is released, said charge of said photo-electrical conversion portion is transferred to said charge detection circuit, and a signal corresponding to said charge is transmitted from said charge detection circuit; and
- a third level between said first and second levels and in which said charge of said photo-electrical conversion portion is not transferred to said charge detection circuit, said resetting of said charge detection circuit is released, and a feed-through signal which does not correspond to said charge of said photo-electrical conversion portion is transmitted from said charge detection circuit.

31. An apparatus according to claim 23, wherein said drive circuit comprises a second horizontal transfer signal generating circuit for transmitting a second multi-leveled horizontal transfer signal in addition to said multi-valued horizontal transfer signal.

32. A solid imaging device drive circuit for reading a signal from a solid imaging device having a photo-electrical conversion means for conducting a photo-electrical conversion and a charge detection circuit for transmitting a signal charge stored in said photo-electrical conversion portion as a signal whose voltage level corresponds to a quantity of said signal charge, said solid imaging device signal processing apparatus comprising:
- a binary signal generating circuit for generating a sole binary signal;
- a vertical transfer signal generating circuit means for transmitting a vertical transfer signal for a vertical transfer to said photo-electrical conversion portion with said binary signal; and
- a horizontal transfer signal generating circuit means for commonly transmitting a multi-valued horizontal transfer signal exceeding a trinary value for causing said charge detection circuit and said photo-electrical conversion portion to transmit a signal containing a feed-through signal period.

33. A circuit according to claim 32, wherein said horizontal transfer signal generating circuit means outputs a horizontal transfer signal of at least trinary valued levels:
- a first level in which said charge of said photo-electrical conversion portion is not transferred to said charge detection circuit and said charge detection circuit is reset;
- a second level in which said resetting of said charge detection circuit is released, said charge of said photo-electrical conversion portion is transferred to said charge detection circuit, and a signal corresponding to said charge is transmitted from said charge detection circuit; and
- a third level between said first and second levels and in which said charge of said photo-electrical conversion portion is not transferred to said charge detection circuit, said resetting of said charge detection circuit is released, and a feed-through signal which does not correspond to said charge of said photo-electrical conversion portion is transmitted from said charge detection circuit.

34. A circuit according to claim 32 further comprising a circuit for generating a blooming restriction signal for restricting blooming.

35. A circuit according to claim 33, wherein a horizontal transfer signal further having a fourth level between said first level and said third level is transmitted.

36. A circuit according to claim 32, wherein said horizontal transfer signal generating circuit means comprises a second horizontal transfer signal generating circuit for transmitting a second multi-valued horizontal transfer signal in addition to said multi-leveled horizontal transfer signal.

37. A circuit according to claim 36, wherein said second multi-valued horizontal transfer signal is in the same phase as that of said multi-valued horizontal transfer signal or in the opposite phase with respect to the same.

* * * * *